US011671457B2

(12) United States Patent
Yeh et al.

(10) Patent No.: US 11,671,457 B2
(45) Date of Patent: Jun. 6, 2023

(54) ON-PREMISES ACTION EXECUTION AGENT FOR CLOUD-BASED INFORMATION TECHNOLOGY AND SECURITY OPERATIONS APPLICATIONS

(71) Applicant: Splunk Inc., San Francisco, CA (US)

(72) Inventors: Anne Yeh, Fremont, CA (US); Jeffery Roberts, Orleans (CA)

(73) Assignee: Splunk Inc., San Francisco, CA (US)

(*) Notice: Subject to any disclaimer, the term of this patent is extended or adjusted under 35 U.S.C. 154(b) by 216 days.

(21) Appl. No.: 17/246,468

(22) Filed: Apr. 30, 2021

(65) Prior Publication Data

US 2022/0353295 A1 Nov. 3, 2022

(51) Int. Cl.
*H04L 9/40* (2022.01)
*G06F 9/451* (2018.01)
(Continued)

(52) U.S. Cl.
CPC .............. *H04L 63/20* (2013.01); *G06F 9/451* (2018.02); *G06F 9/54* (2013.01); *G06F 16/245* (2019.01);
(Continued)

(58) Field of Classification Search
CPC ... H04L 63/20; H04L 9/0643; H04L 63/0281; H04L 63/0442; H04L 63/029;
(Continued)

(56) References Cited

U.S. PATENT DOCUMENTS 7,937,344 B2   5/2011   Baum et al.
8,112,425 B2   2/2012   Baum et al.
(Continued)

FOREIGN PATENT DOCUMENTS

WO   2010/030458 A2   3/2010

OTHER PUBLICATIONS

Splunk Enterprise 8.0.0 Overview, available online, retrieved May 20, 2020 from docs.splunk.com.
(Continued)

*Primary Examiner* — Darren B Schwartz
(74) *Attorney, Agent, or Firm* — Nicholson De Vos Webster & Elliott LLP

(57) ABSTRACT

Techniques are described for providing on-premises action execution agents used to execute orchestration, automation, and response (OAR) actions in users' IT environments. An on-premises action execution agent can be used to execute actions involving computing resources located in users' on-premises IT environments, where such resources may be located behind a firewall and thus not directly accessible to an IT and security operations application running in a cloud-based environment or elsewhere. An intermediary secure tunnel service is used to establish secure connections between an IT and security operations application and on-premises action execution agents, thereby enabling the encrypted transfer of credentials, API tokens, and other sensitive information used by an on-premises action execution agent to execute actions. The executed actions can include on-demand actions initiated by a user and automated actions included, e.g., as part of a playbook that is executed responsive to the identification of certain types of incidents.

18 Claims, 21 Drawing Sheets

(51) Int. Cl.
  *G06F 9/54* (2006.01)
  *G06F 16/245* (2019.01)
  *H04L 9/06* (2006.01)
  *G06F 21/55* (2013.01)
(52) U.S. Cl.
  CPC ........ *H04L 9/0643* (2013.01); *H04L 63/0281*
    (2013.01); *H04L 63/0442* (2013.01)
(58) Field of Classification Search
  CPC . H04L 63/1416; H04L 63/1441; G06F 9/451;
    G06F 9/54; G06F 16/245; G06F 21/554
  See application file for complete search history.

(56) References Cited

U.S. PATENT DOCUMENTS

| | | | |
|---|---|---|---|
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,986,117 B1* | 4/2021 | Agbabian | G06F 21/6218 |
| 2008/0248794 A1* | 10/2008 | Mirza-Baig | H04L 41/0809 |
| | | | 455/423 |
| 2011/0314148 A1* | 12/2011 | Petersen | H04L 63/1408 |
| | | | 709/224 |
| 2013/0091574 A1* | 4/2013 | Howes | G06F 21/554 |
| | | | 726/25 |
| 2013/0332996 A1* | 12/2013 | Fiala | H04W 12/35 |
| | | | 709/227 |
| 2016/0080417 A1* | 3/2016 | Thomas | H04L 63/1416 |
| | | | 726/1 |
| 2016/0226731 A1* | 8/2016 | Maroulis | H04L 69/40 |
| 2017/0041347 A1* | 2/2017 | Nagaratnam | H04L 63/0227 |
| 2017/0272469 A1* | 9/2017 | Kraemer | H04L 63/1416 |
| 2017/0300690 A1* | 10/2017 | Ladnai | G06F 21/56 |
| 2018/0191771 A1* | 7/2018 | Newman | G06F 21/552 |
| 2018/0270109 A1* | 9/2018 | Hollis | H04L 41/0803 |
| 2018/0349482 A1* | 12/2018 | Oliner | H04L 41/22 |
| 2019/0068627 A1* | 2/2019 | Thampy | G06N 20/20 |
| 2019/0098037 A1* | 3/2019 | Shenoy, Jr. | H04L 63/1441 |
| 2019/0098106 A1 | 3/2019 | Mungel et al. | |
| 2019/0334764 A1* | 10/2019 | Chor | H04L 63/1408 |
| 2020/0045016 A1 | 2/2020 | Chor et al. | |
| 2020/0162497 A1* | 5/2020 | Iyer | H04L 63/164 |
| 2020/0382554 A1* | 12/2020 | McCarty | G06F 21/6263 |
| 2021/0035116 A1* | 2/2021 | Berrington | G06F 9/54 |
| 2021/0117251 A1 | 4/2021 | Cristofi et al. | |
| 2021/0266306 A1* | 8/2021 | Furman | H04L 63/08 |
| 2021/0373927 A1* | 12/2021 | Pillay | G06F 9/5077 |
| 2021/0374767 A1* | 12/2021 | Kurian | G06F 40/30 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
International Search Report and Written Opinion, PCT App. No. PCT/US22/25524, dated Jul. 8, 2022, 11 pages.

\* cited by examiner

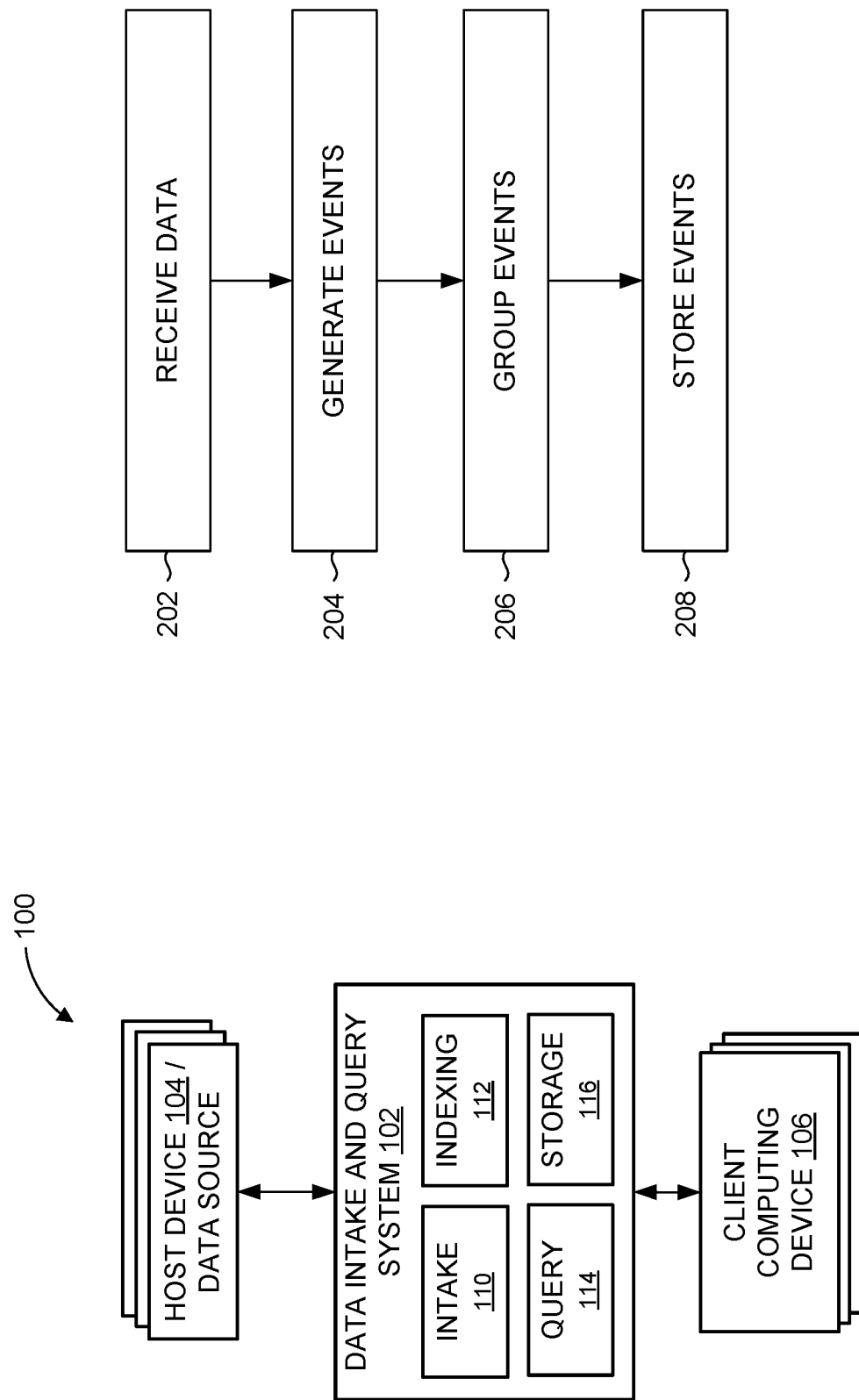

302

302A
127.0.0.1 – eva [10/Oct/2000:13:55:36 -0700] "GET/apache.gif HTTP/1.0" 200 2326 0.0947
127.0.0.1 – emerson [10/Oct/2000:13:56:36 -0700] "GET/eastwood.gif HTTP/1.0" 200 2980 0.0899
302C  302B
127.0.0.3 – eliza [10/Oct/2000:13:57:36 -0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif  302D
302E
91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

304

```
docker: {
        container_id: f7360a148a670c4c257f4ee024be81284b6017d72ae41ea8ee5d
}
kubernetes: {                              304A
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal    304B
}
log: I0503 23:04:12.595203    1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}
```

306

| time | ID | CPU | memory |
|---|---|---|---|
| 10/10/00 12:01:00.013 | eliza | 14% | 80% |
| 10/10/00 12:01:05.153 | eva | 26% | 70% |

PLAYBOOKS MANAGEMENT INTERFACE 600

IT & Security Operations Application 🔍

| Playbooks ∨ | | Custom Lists | | | 🔔 admin |
| --- | --- | --- | --- | --- | --- |

📖 🔄 📥    + PLAYBOOK

PLAYBOOKS LIST 602

| Name | Label ∨ | Repo ∨ | Category ∨ | Status ∨ |
| --- | --- | --- | --- | --- |
| Playbook 1 \| Successful Executions: 10 \| Failed Executions 2 \| Last Updated: Jan. 10, 2019<br>This playbook can be used to remediate virus-related incidents at endpoint devices. | events | community | IT ops | active |
| Playbook 2 \| Successful Executions: 2 \| Failed Executions 0 \| Last Updated: Dec. 30, 2018<br>This playbook can be used to geo-locate IP addresses. | events | community | Security | inactive |
| Playbook 3 \| Successful Executions: 50 \| Failed Executions 5 \| Last Updated: Nov. 10, 2018<br>This playbook can be used to quarantine endpoint devices. | events | community | Sample | inactive |
| Playbook 4 \| Successful Executions: 20 \| Failed Executions 0 \| Last Updated: Aug. 8, 2018<br>This playbook can be used to remediate virus-related incidents at endpoint devices. | | private | Sample | active |
| Playbook 5 \| Successful Executions: 0 \| Failed Executions 0 \| Last Updated: Jan. 20, 2019<br>This playbook can be used to restart servers experiencing issues. | campaign | community | | inactive |

< ① 2 3 4 5 >    Show 5 ∨

FIG. 13

| IT & Security Operations Application | Dashboards v  Investigations  Playbooks  Apps  Reports  Search | 🔍 ⚙ 🔔 👤 |
|---|---|---|

Automation Broker

+ AUTOMATION BROKER

DEFAULT AUTOMATION BROKER

Select a default automation broker for saving custom playbooks. You can select a different automation broker later in your custom playbook settings.

Select an automation broker ⌄

🔍 Search

| ☐ ▶ NAME | CREATED | UPDATED | BROKER STATUS | VERSION | KEYS LAST ROTATED |
|---|---|---|---|---|---|
| ☐ Automation_broker_A | Dec 03, 12:54P | Dec 03, 12:54P | Active | 1.0 | 4 days ago |
| ☐ Automation_broker_B | Dec 03, 12:54P | Dec 03, 12:54P | Active | 1.0 | 1 days ago |
| ☐ Automation_broker_C | Dec 03, 12:54P | Dec 03, 12:54P | Active | 1.1 | 4 days ago |
| ☐ Automation_broker_D | Dec 03, 12:54P | Dec 03, 12:54P | Inactive | 1.0 | 2 days ago |
| ☐ Automation_broker_E | Dec 03, 12:54P | Dec 03, 12:54P | Active | 1.3 | 12 days ago |
| ☐ Automation_broker_F | Dec 03, 12:54P | Dec 03, 12:54P | Inactive | 1.0 | 4 days ago |

1300

1302

🔍 Search Settings

▲ Company Settings
▲ Administration Settings
▶ Product Settings
    Clickable URLs
    Clustering
    Multi-tenancy
    Aggregation
    Workbooks
    Telemetry
    Field Mappings
    Event Forwarding
    Automation Broker
▲ Event Settings
▲ User Management
    Mobile
▲ System Health
    About

ON-PREMISES ACTION EXECUTION AGENT FOR CLOUD-BASED INFORMATION TECHNOLOGY AND SECURITY OPERATIONS APPLICATIONS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 6 illustrates an example interface used to manage digital playbooks within an IT and security operations application according to some embodiments.

FIG. 13 illustrates an example on-premises action execution agent details interface according to some embodiments.

DETAILED DESCRIPTION

Figure 3B:
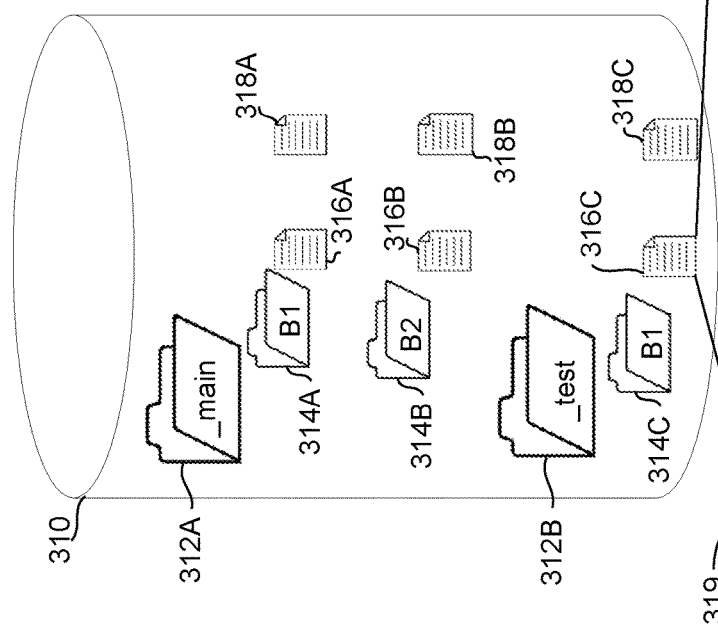
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events, each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters forms a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (TOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud Pub Sub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112 but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
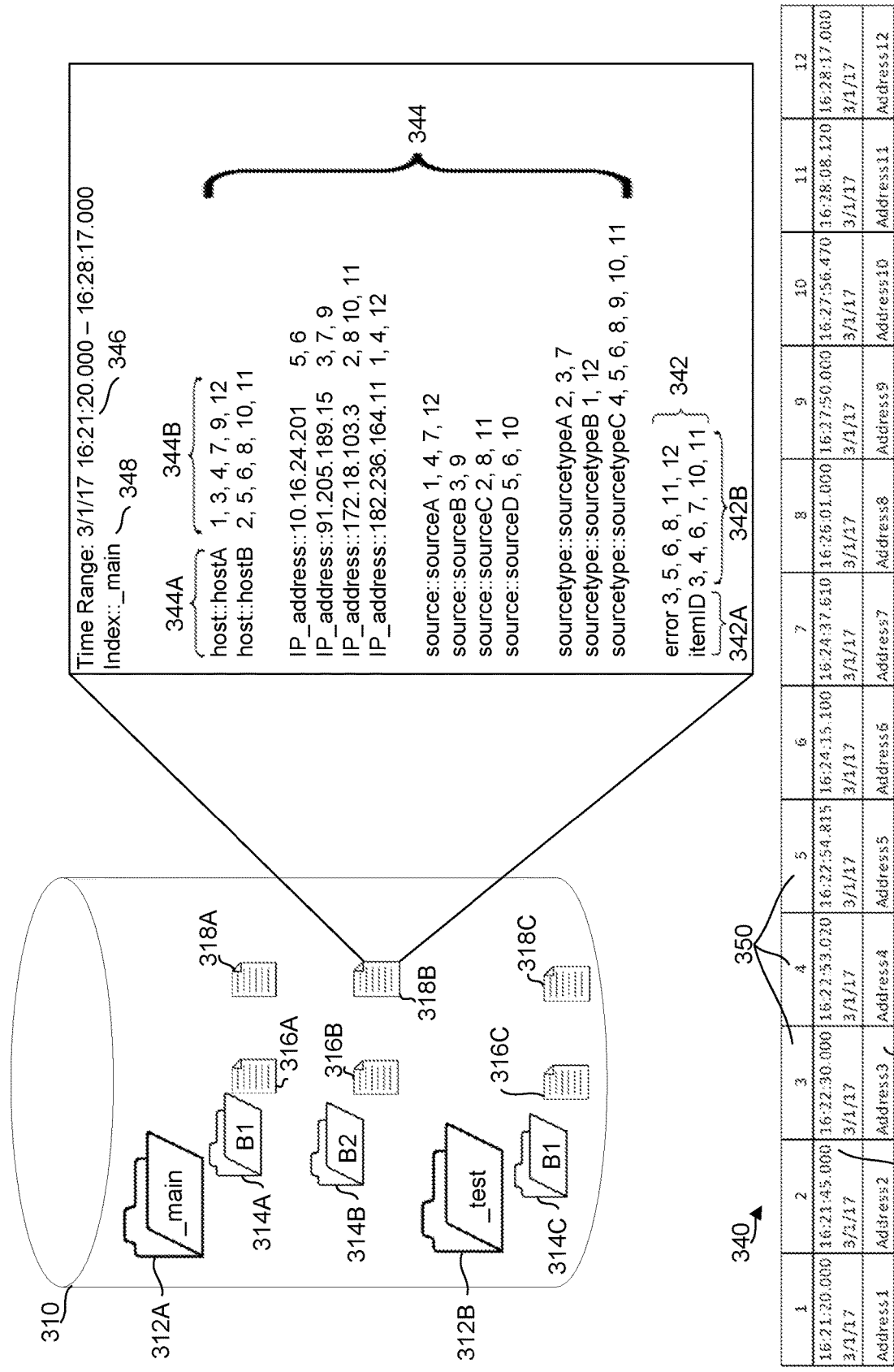

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip 172 20 43 173.ec2.internal, pod_id:0a73017b-4efa-11e8-a4e1-

0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a test directory 312B associated with an index "test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B 1" of index "test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
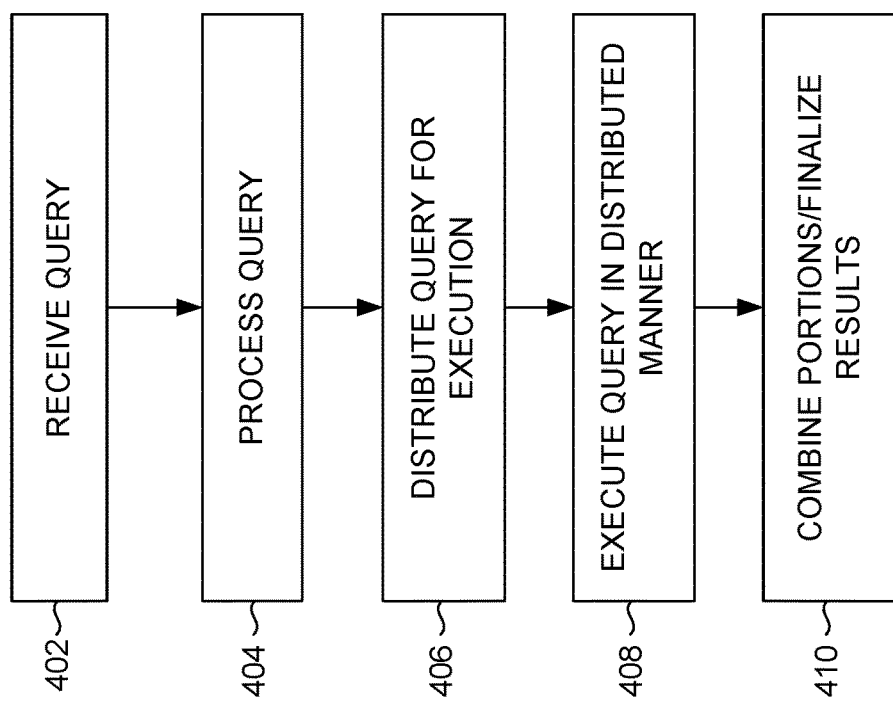
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries, or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all the SPL commands in the sequence of SPL commands can be separated from one another by a pipe symbol "1." In such embodiments, a set of data, such as a set of events, can be operated on by a first SPL command in the sequence, and then a subsequent SPL command following a pipe symbol "1" after the first SPL command operates on the results produced by the first SPL command or other set of data, and so on for any additional SPL commands in the sequence. As such, a query formulated using SPL comprises a series of consecutive commands that are delimited by pipe "1" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
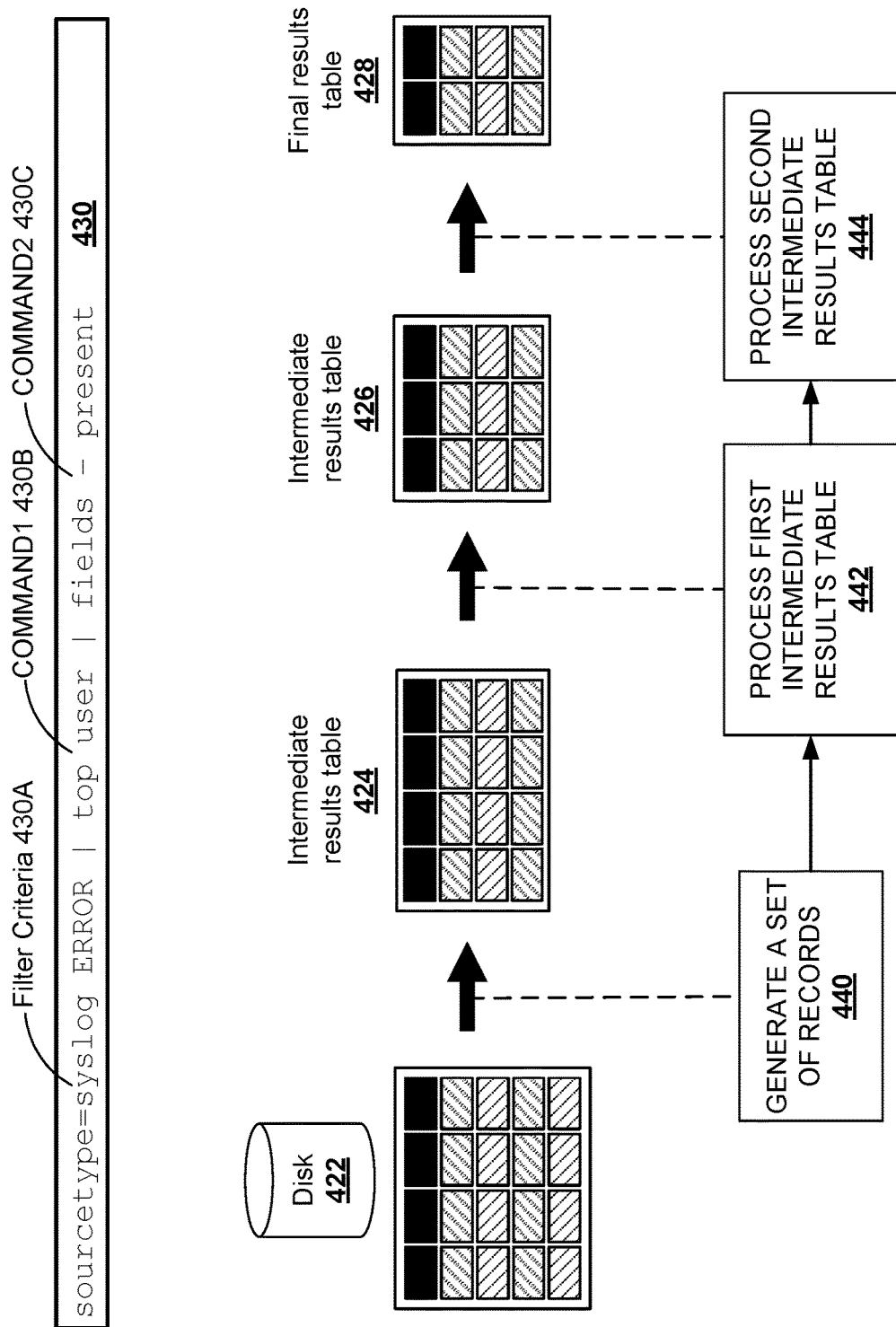
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
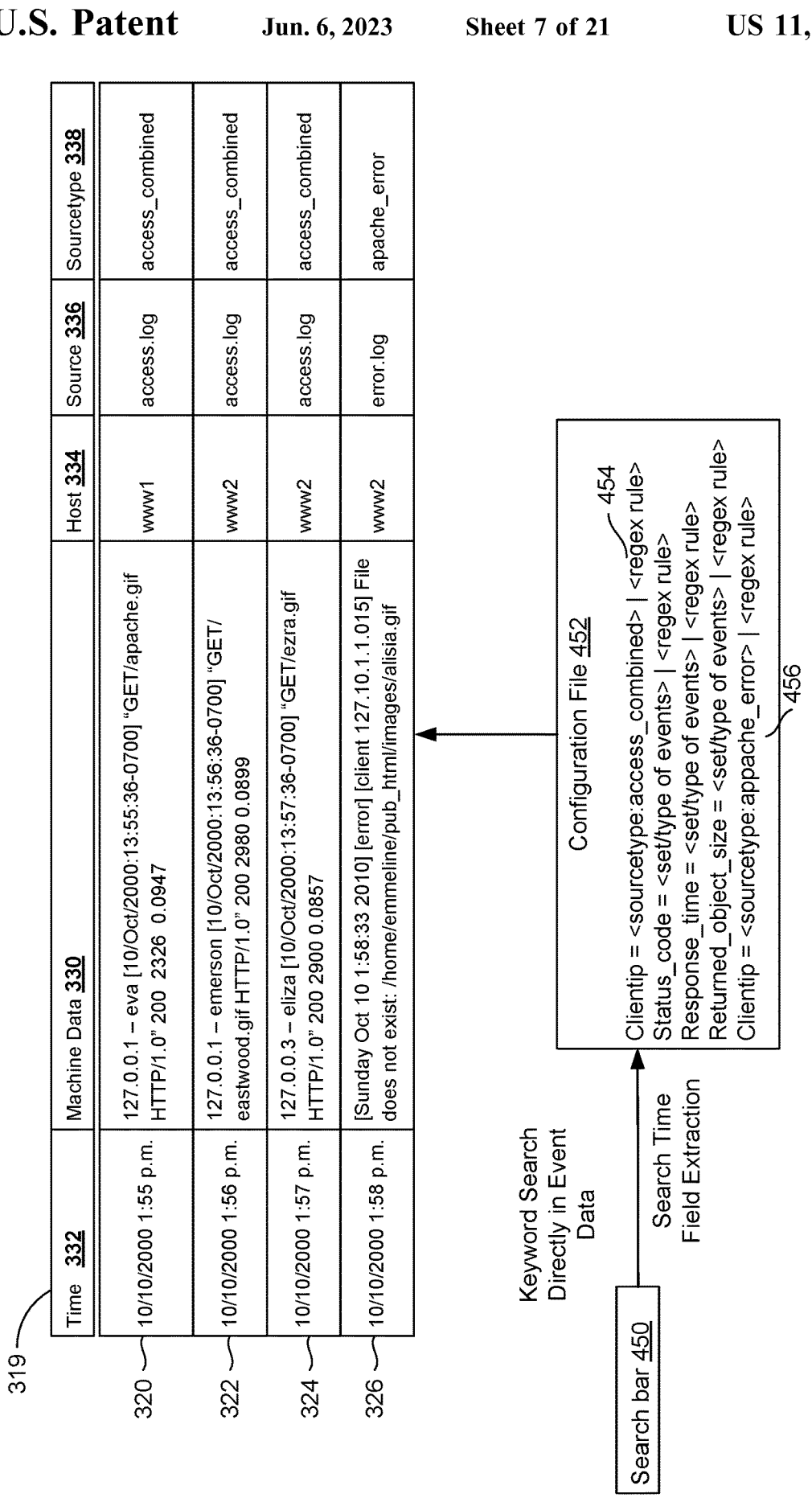
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query includes fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error"|prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
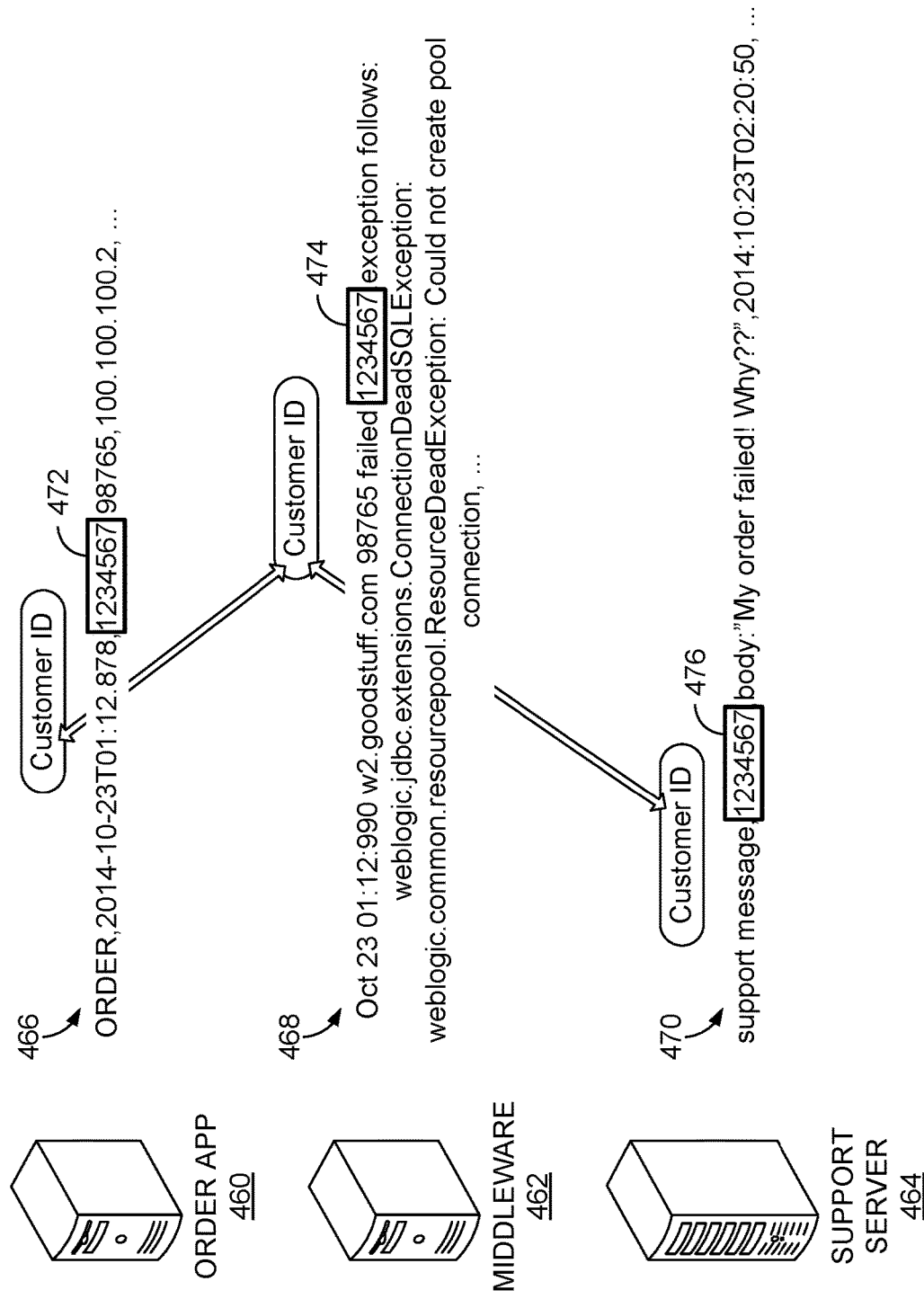
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. It and Security Operations Application Overview

As indicated herein, the management of modern IT environments often involves administering a large number of computing devices and software components operating within such environments. A system administrator of even a modestly sized IT environment might be responsible for the operation and security of numerous servers, endpoint devices, firewalls, and various types of software products and services running on those devices. Systems such as the SPLUNK® ENTERPRISE system, as well as various other SIEM, security, and IT operations applications, provide ways to organize, analyze, diagnose, and provide intelligence related to the operation of components in users' IT environments.

The management and administration of IT environments often further includes responding to various types of incidents that occur from time to time, where such incidents may be identified based on analyses of the data generated by IT components in those environments. These incidents, for example, can include security-related incidents (viruses, malware, network-based attacks, etc.), IT operations-related incidents (e.g., hardware failures, software failures due to bugs or other issues, etc.), or any other incidents that potentially impact the security or operation of an IT environment. Occurrences of such incidents can be flagged by the systems detecting the incidents and incident-related information may be provided to an administrator or other user for analysis and remediation. Once an incident is identified, the process for remediating such incidents can involve interacting with one or several computing resources within the IT environment to update device or application configurations, apply security rules, etc. For example, responsive to the identification of a security-related issue involving an endpoint device, a system administrator might use security software to quarantine the endpoint device, interact with a firewall to update network settings to block one or more network addresses, among other possible actions.

The ability for security analysts to readily respond to these and other types of incidents in an IT environment can be aided by use of an IT and security operations platform or application, sometimes also referred to as an orchestration, automation, and response (OAR) platform or application, such as the SPLUNK PHANTOM™ application. An IT and security operations application generally enables users to connect disparate collections of computing devices and applications in IT environments and to automate tasks typically performed manually by system administrators and other users responsive to the identification of various types of IT- and security-related incidents.

Figure 5:
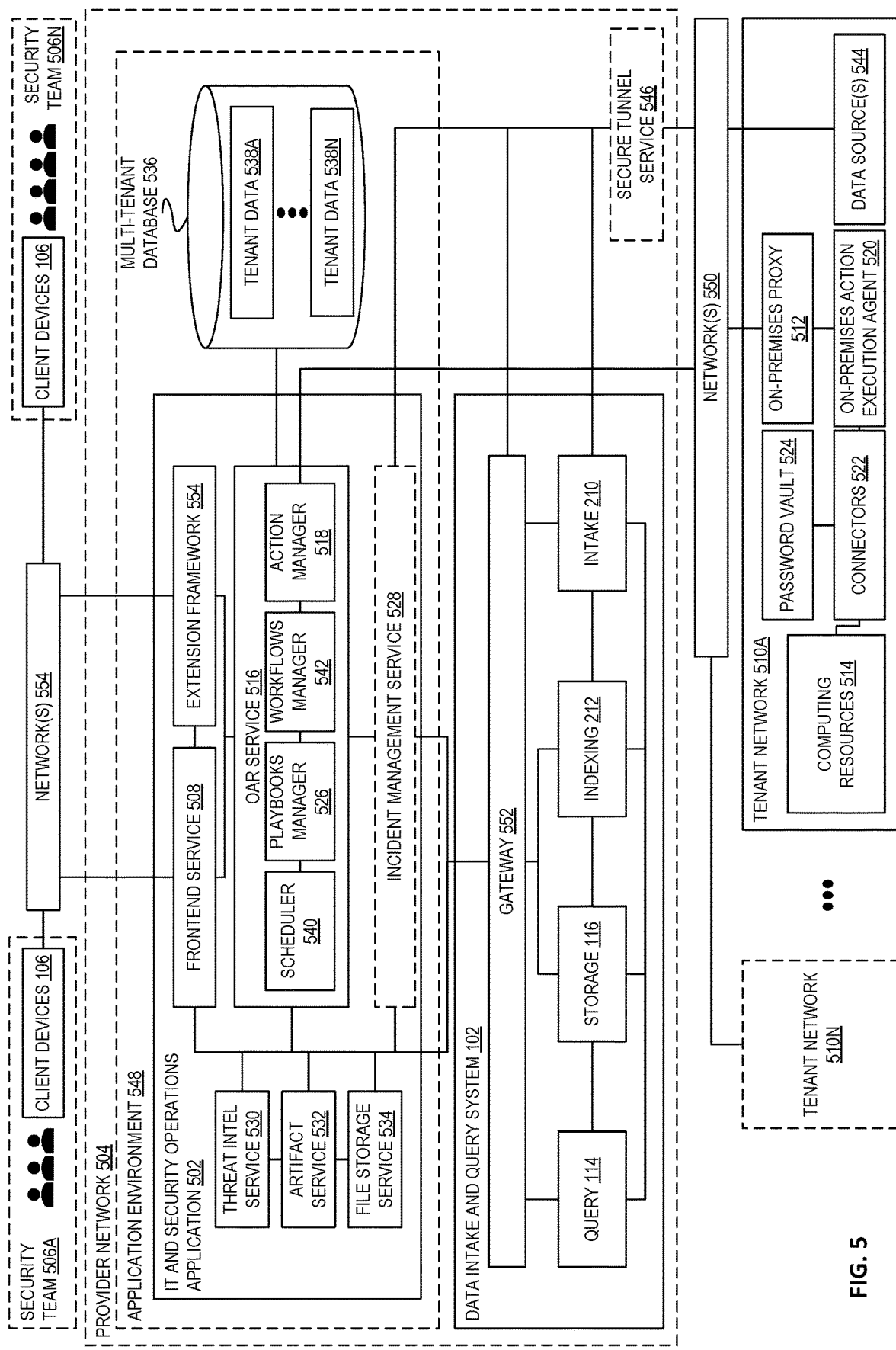
FIG. 5 is a block diagram of an example computing environment including an information technology (IT) and security operations application according to some embodiments.

FIG. 5 is a block diagram illustrating an example networked computing environment including an IT and security operations application according to some embodiments. In some embodiments, an IT and security operations application 502 comprises software components executed by one or more electronic computing devices. In some embodiments, the computing devices are provided by a cloud provider network 504 (e.g., as part of a shared computing resource environment). In other embodiments, an IT and security operations application 502 operates on computing devices managed within an on-premises datacenter or other computing environment, or on computing devices located within a combination of cloud-based and on-premises computing environments.

The IT and security operations application 502 generally enables users to perform security orchestration, automation, and response operations involving components of an organization's computing infrastructure (or components of multiple organizations' computing infrastructures). Among other benefits, an IT and security operations application 502 enables security teams and other users to automate repetitive tasks, to efficiently respond to security incidents and other operational issues, and to coordinate complex workflows across security teams and diverse IT environments. For example, users associated with various IT operations or security teams (sometimes referred to herein as "analysts," such as analysts that may be part of example security teams 506A and 506N) can use various client devices 106 to interact with the IT and security operations application 502 via one or more network(s) 554 to perform operations relative to IT environments for which they are responsible (such as, for example, one or more tenant networks 510A-510N, which may be accessible over one or more network(s) 550, where network(s) 550 may be the same or different from network(s) 554). Although only two security teams are depicted in the example of FIG. 5, in general, any number of separate security teams can concurrently use the IT and security operations application 502 to manage any number of respective tenant networks, where each individual security team may be responsible for one or more tenant networks.

In some embodiments, users can interact with an IT and security operations application 502 and data intake and query system 108 using client devices 106. The client devices 106 may communicate with the IT and security operations application 502 and with data intake and query system 102 in a variety of ways such as, for example, over an internet protocol via a web browser or other application, via a command line interface, via a software developer kit (SDK), and the like. In some embodiments, the client devices 106 can use one or more executable applications or programs from the application environment 548 to interface with the data intake and query system 102, such as the IT and security operations application 502. In some embodiments, the application environment 548 include tools, software modules (for example, computer executable instructions to perform a particular function), etc., that enable application developers to create computer executable applications to interface with the data intake and query system 102. The IT and security operations application 502, for example, can use aspects of the application environment 548 to interface with the data intake and query system 102 to obtain relevant data, process the data, and display it in a manner relevant to the IT operations context. As shown, the IT and security operations application 502 further includes additional backend services, middleware logic, front-end user interfaces, data stores, and other computing resources, and provides other facilities for ingesting use case specific data and interacting with that data, as described elsewhere herein.

As an example of using the application environment 548, the IT and security operations application 502 includes custom web-based interfaces (e.g., provided at least in part by a frontend service 508) that optionally leverage one or more user interface components and frameworks provided by the application environment 548. In some embodiments, an IT and security operations application 502 includes, for example, a "mission control" interface or set of interfaces. In this context, "mission control" refers to any type of interface or set of interfaces that broadly enable users to obtain information about their IT environments, to configure automated actions, playbooks, etc., and to perform operations related to IT and security infrastructure management. The IT and security operations application 502 further includes middleware business logic (including, for example, an optional incident management service 528, a threat intelligence service 530, an artifact service 532, a file storage service 534, and an orchestration, automation, and response (OAR) service 516) implemented on a middleware platform of the developer's choice. Furthermore, in some embodiments, an IT and security operations application 502 is instantiated and executed in a different isolated execution environment relative to the data intake and query system 102. As a non-limiting example, in embodiments where the data intake and query system 102 is implemented at least in part in a Kubernetes cluster, the IT and security operations application 502 may execute in a different Kubernetes cluster (or other isolated execution environment system) and interact with the data intake and query system 102 via the gateway 552.

In some embodiments, where an IT and security operations application 502 is deployed in a tenant network, the application can instead be deployed as a virtual appliance at one or more computing devices managed by an organization using the IT and security operations application 502. A virtual appliance, for example, may comprise a VM image file that is pre-configured to run on a hypervisor or directly on the hardware of a computing device and that includes a pre-configured operating system upon which the IT and security operations application 502 executes. In other embodiments, the IT and security operations application 502 can be provided and installed using other types of standalone software installation packages or software package management systems. Depending on the implementation and user preference, an IT and security operations application 502 optionally can be configured on a standalone server or in a clustered configuration across multiple separate computing devices.

In some embodiments, a user initially configures an IT and security operations application 502 using a web console or other interface provided by the IT and security operations application 502 (for example, as provided by a frontend service 508 of the IT and security operations application 502). For example, users can use a web browser or other application to navigate to the IP address or hostname associated with the IT and security operations application 502 to access console interfaces, dashboards, and other interfaces used to interact with various aspects of the application. The initial configuration can include creating and configuring user accounts, configuring connection settings to one or more tenant networks (for example, including settings associated with one or more on-premises proxies 512 used to establish connections between on-premises networks and the IT and security operations application 502 running in a provider network 504 or elsewhere), and performing other optional configurations.

In some embodiments, a user (also referred to herein as a "customer," "tenant," or "analyst") of an IT and security operations application 502 can create one or more user accounts to be used by a security team and other users associated with the tenant. A user of the IT and security operations application 502 typically desires to use the application to manage one or more tenant networks for which the user is responsible (illustrated by example tenant networks 510A, ..., 510N in FIG. 5). A tenant network includes any number of computing resources 514 operating as part of a corporate network or other networked computing environment with which a tenant is associated. Although the tenant networks 510A, ..., 510N are shown as separate from the provider network 504 in FIG. 5, more generally, a tenant network can include components hosted in an on-premises network, in the provider network 504, or combinations of both (for example, as a hybrid cloud network).

In an embodiment, each of the computing resources 514 in a tenant network can potentially serve as a source of incident data to an IT and security operations application 502, a computing resource against which actions can be performed by the IT and security operations application 502, or both. The computing resources 514 can include various types of computing devices, software applications, and services including, but not limited to, a data intake and query system (which itself can ingest and process machine data generated by other computing resources 514), a SIEM system, a REST client that obtains or generates incident data based on the activity of other computing resources 514, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The computing resources 514 may execute upon any number separate computing devices and systems within a tenant network.

During operation, data intake and query systems, STEM systems, REST clients, and other system components of a tenant network obtain operational, performance, and security data from computing resources 514 in the network, analyze the data, and optionally identify potential IT-related incidents. A data intake and query system in a tenant network, for example, might identify potential IT-related incidents based on the execution of one or more correlation searches against data ingested and indexed by the system, as described elsewhere herein. Other data sources 544 may obtain incident-related data using other processes. Once obtained, data indicating such incidents is sent to the data intake and query system 102 or IT and security operations application 502 via an on-premises proxy 512. For example, once a data intake and query system identifies a possible security threat or other IT-related incident based on data ingested by the data intake and query system, data representing the incident can be sent to the data intake and query system 102 via a REST API endpoint implemented by a gateway 552 or a similar gateway of the IT and security operations application 502. As mentioned elsewhere herein, a data intake and query system 102 or IT and security operations application 502 may ingest, index, and store data received from each tenant network in association with a corresponding tenant identifier such that each tenant's data is segregated from other tenant data (for example, when stored in common storage 116 of the data intake and query system 102 and a multi-tenant database 536 of the IT and security operations application 502).

As mentioned, in some embodiments, some or all of the data ingested and created by an IT and security operations application 502 in association with a particular tenant is generally maintained separately from other tenants (for example, as illustrated by tenant data 538A, . . . , 538N in the multi-tenant database 536). In some embodiments, a tenant may further desire to keep data associated with two or more separate tenant networks segregated from one another. For example, a security team associated with a managed security service provider (MSSP) may be responsible for managing any number of separate tenant networks for various customers of the MSSP. As another example, a tenant corresponding to a business organization having large, separate departments or divisions may desire to logically isolate the data associated with each division. In such instances, a tenant can configure separate "departments" in the IT and security operations application 502, where each department is associated with a respective tenant network or other defined collection of data sources, computing resources, and so forth. Users and user teams can thus use this feature to manage multiple third-party entities or organizations using only a single login and permissions configuration for the IT and security operations application 502.

In some embodiments, once an IT and security operations application 502 obtains incident data, either directly from a tenant network or indirectly via a data intake and query system 102, the IT and security operations application 502 analyzes the incident data and enables users to investigate, determine possible remediation actions, and perform other operations. These actions can include default actions initiated and performed within a tenant network without direct interaction from user and can further include suggested actions provided to users associated with the relevant tenant networks. Once the suggested actions are determined, for example, these actions can be presented in a "mission control" dashboard or other interface accessible to users of the IT and security operations application 502. Based on the suggested actions, a user can select one or more particular actions to be performed and the IT and security operations application 502 can carry out the selected actions within the corresponding tenant network. In the example of FIG. 5, an orchestration, automation, and response (OAR) service 516 of the IT and security operations application 502, which includes an action manager 518, can cause actions to be performed in a tenant network by sending action requests via network 550 to an on-premises proxy 512, which further interfaces with an on-premises action execution agent (for example, on-premises action execution agent 520 in tenant network 510A). In this example, the on-premises action execution agent 520 is implemented to receive action requests from an action manager 518 and to carry out requested actions against computing resources 514 using connectors 522 and optionally a password vault 524 (e.g., to authenticate a connector to one or more computing resources 514).

In some embodiments, to execute actions against computing resources in tenant networks and elsewhere, an IT and security operations application 502 uses a unified security language that includes commands usable across a variety of hardware and software products, applications, and services. To execute a command specified using the unified security language, in some embodiments, the IT and security operations application 502 (via an on-premises action execution agent 520) uses one or more connectors 522 to translate the commands into the one or more processes, languages, scripts, etc., necessary to implement the action at one or more particular computing resources 514. For example, a user might provide input requesting the IT and security operations application 502 to remove an identified malicious process from multiple computing systems in the tenant network 510A, where two or more of the computing systems are associated with different software configurations (for example, different operating systems or operating system versions). Accordingly, in some embodiments, the IT and security operations application 502 can send an action request to an on-premises action execution agent 520, which then uses one or more connectors 522 to translate the command into the necessary processes to remove each instance of the malicious process on the varying computing systems within the tenant network (including the possible use of credentials and other information stored in the password vault 524).

In some embodiments, an IT and security operations application 502 includes a playbooks manager 526 that enables users to automate actions or series of actions by creating digital "playbooks" that can be executed by the IT and security operations application 502. At a high level, a playbook is a customizable computer program that can be executed by an IT and security operations application 502 to automate a wide variety of possible operations related to an IT environment. These operations—such as quarantining devices, modifying firewall settings, restarting servers, and so forth—are typically performed by various security products by abstracting product capabilities using an integrated "app model." Additional details related to operation of the IT and security operations application 502 and use of digital playbooks are provided elsewhere herein.

As mentioned, an IT and security operations application 502 may be implemented as a collection of interworking services that each carry out various functionality as described herein. In the example shown in FIG. 5, the IT and security operations application 502 includes an incident management service 528, a frontend service 508, an artifact service 532, a threat intelligence service 530, a file storage service 534, and an orchestration, automation, and response (OAR) service 516. The set of services comprising the IT and security operations application 502 in FIG. 5 are provided for illustrative purposes only; in other embodiments, an IT and security operations application 502 can be comprised of more or fewer services and each service may implement the functionality of one or more of the services shown.

In some embodiments, an incident management service 528 is responsible for obtaining incidents or events (sometimes also referred to as "notables"), either directly from various data sources in tenant networks or directly based on data ingested by the data intake and query system 102 via the gateway 552. In some embodiments, the frontend service 508 provides user interfaces to users of the application, among other processes described herein. Using these user interfaces, users of the IT and security operations application 502 can perform various application-related operations, view displays of incident-related information, and can configure administrative settings, license management, content management settings, and so forth. In some embodiments, an artifact service 532 manages artifacts associated with incidents received by the application, where incident artifacts can include information such as IP addresses, usernames, file hashes, and so forth. In some embodiments, a threat intelligence service 530 obtains data from external or internal sources to enable other services to perform various incident data enrichment operations. As one non-limiting example, if an incident is associated with a file hash, a threat intelligence service 530 can be used to correlate the file hash with external threat feeds to determine whether the file hash has been previously identified as malicious. In some embodiments, a file storage service 534 enables other services to store incident-related files, such as email attachments, files, and so forth. In some embodiments, an OAR service 516 performs a wide range of OAR capabilities such as action execution (via an action manager 518), playbook execution (via a playbooks manager 526), scheduling work to be performed (via a scheduler 540), user approvals and so forth as workflows (via a workflows manager 542), and other functionality and described herein.

5.1. Data Intake

The operation of an IT and security operations application 502 generally begins with the ingestion of data related to various types of incidents involving computing resources of various tenant networks (for example, computing resources 514 of a tenant network 510A). In some embodiments, users configure an IT and security operations application 502 to obtain, or "ingest," data from one or more defined data sources 544, where such data sources can be any type of computing device, application, or service that supplies information that users may want to store or act upon, and where such data sources may include one or more of the computing resources 514 or data sources which generate data based on the activity of one or more computing resources 514. As mentioned, examples of data sources include, but are not limited to, a data intake and query system such as the SPLUNK® ENTERPRISE system, a STEM system, a REST client, applications, routers, intrusion detection systems (IDS)/intrusion prevention systems (IDP) systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some embodiments, data can be sent from tenant networks to an IT and security operations application 502 using any of several different mechanisms. As one example, data can be sent to data intake and query system 102, processed by the intake system 210, and obtained by an incident management service 528 of the IT and security operations application 502 via a gateway 552. As another example, data can be sent from a tenant network directly to the incident management service 528, for example, via a REST endpoint.

In some embodiments, data ingested by an IT and security operations application 502 from configured data sources is represented in the IT and security operations application 502 by data structures referred to as "incidents," "events," "notables," or "containers". Here, an incident or event is a structured data representation of data ingested from a data source and that can be used throughout the IT and security operations application 502. In some embodiments, an IT and security operations application 502 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

In some embodiments, each incident of an IT and security operations application 502 can be associated with a "status" or "state" that may change over time. This status information can be used by analysts, for example, to indicate to other analysts what incidents are being worked upon, what incidents have been closed or resolved, what incidents are awaiting input or action, and the like. Furthermore, the transitions of incidents from one status to another can be used to generate various metrics related to analyst efficiency and other measurements of analyst teams. For example, the IT and security operations application 502 may be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams may also create custom statuses to indicate incident states that may be more specific to the way the particular analyst team operates, and further create custom efficiency measurements based on such custom statuses.

In some embodiments, the IT and security operations application 502 also generates and stores data related to its operation and activity conducted by various tenant users including, for example, playbook data, workbook data, user account settings, configuration data, and historical data (such as, for example, data indicating actions taken by various users relative to particular incidents or artifacts, data indicating responses from computing resources based on action executions, and so forth), in one or more multi-tenant databases 536. In other embodiments, some or all the data above is stored in storage managed by the data intake and query system 102 and accessed via the gateway. These multi-tenant database(s) 536 may operate on a same computer system as the IT and security operations application 502 or at one or more separate database instances. As mentioned, in some embodiments, the storage of such data by the data intake and query system 102 and IT and security operations application 502 for each tenant is generally segregated from data associated with other tenants based on tenant identifiers stored with the data or other access control mechanisms.

5.2. Actions

In some embodiments, an IT and security operations application 502 defines many different types of "actions," which represent high-level, vendor- and product-agnostic primitives that can be used throughout the IT and security operations application 502. Actions generally represent simple and user-friendly verbs that are used to execute actions in playbooks and manually through other user interfaces of the IT and security operations application 502, where such actions can be performed against one or more computing resources in an IT environment. In many cases, a same action defined by the IT and security operations application 502 can be carried out on computing resources associated with different vendors or configurations via action translation processes performed by various "connectors" of the platform, as described in more detail elsewhere herein. Examples of actions that may be defined by an IT and security operations application 502 include a "get process dump" action, a "block IP address" action, a "suspend VM" action, a "terminate process" action, and so forth.

5.3. Connectors

In some embodiments, an IT and security operations application 502 enables connectivity with various IT computing resources in a provider network 504 and in tenant networks 510A, . . . , 510N, including IT computing resources from a wide variety of third-party IT and security technologies, and further enables the ability to execute actions against those computing resources via "connectors" (such as the connectors 522 in tenant network 510A and connectors implemented as part of the IT and security operations application 502). In general, a connector 522 represents program code that provides an abstraction layer (for example, via a library, API, or other interface) to one or more of hundreds of possible IT and security-related products and services and which exposes lists of actions supported by those products and services. Each connector 522 may also define which types of computing resources that the connector can operate on.

As one example, an IT and security operations application 502 may be configured with a connector 522 that enables the application to communicate with a VM product provided by a third-party vendor. In this example, the connector for the VM product enables the IT and security operations application 502 to take actions relative to VM instances within a user's IT environment, including starting and stopping the VMs, taking VM snapshots, analyzing snapshots, and so forth. In order for the connector to communicate with a VM manager or with individual instances, the connector 522 can be configured with login credentials, hostname or IP address, and so forth, for each instance with which communication is desired (or configured to obtain such information from a password vault 524). Other connectors 522 may be available for VM products from other third-party vendors, where those connectors are configured to translate some or all the same actions that are available with respect to the first type of VM product. In general, connectors 522 enable interaction with virtually any type of IT computing resource 514 in an IT environment and can be added and updated over time to support new types of computing resources.

5.4. Computing Resources

In some embodiments, IT computing resources 514 include physical or virtual components within an organization with which an IT and security operations application 502 communicates (for example, via connectors as described above). Examples of computing resources 514 include, but are not limited to, servers, endpoint devices, applications, services, routers, and firewalls. A computing resource 514 is represented in an IT and security operations application 502 by data identifying the computing resource, including information used to communicate with the device or service such as, for example, an IP address, automation service account, username, password, etc. In some embodiment, one or more computing resources 514 can be configured as a source of incident information that is ingested by an IT and security operations application 502. The types of computing resources 514 that can be configured in the IT and security operations application 502 may be determined in some cases based on which connectors 522 are installed for a particular user. In some embodiments, automated actions can be configured with respect to various computing resources 514 using playbooks, described in more detail elsewhere herein. Each computing resource 514 may be hosted in an on-premises tenant network, a cloud-based provider network, or any other network or combination thereof.

5.5. Playbooks

In some embodiments, the operation of an IT and security operations application 502 includes the ability to create and execute customizable playbooks. At a high level, a playbook comprises computer program code and possibly other data that can be executed by an IT and security operations application 502 to carry out an automated set of actions (for example, as managed by a playbooks manager 526 as part of the OAR service 516). In some embodiments, a playbook is comprised of one or more functions, or codeblocks or function blocks, where each function contains program code that performs defined functionality when the function is encountered during execution of the playbook of which it is a part. As an example, a first function block of a playbook might implement an action that upon execution affects one or more computing resources 514 (e.g., by configuring a network setting, restarting a server, etc.); another function block might filter data generated by the first function block in some manner; yet another function block might obtain information from an external service, and so forth. A playbook is further associated with a control flow that defines an order in which the function blocks of the playbook are executed, where a control flow may vary at each execution of a playbook depending on particular input conditions (e.g., where the input conditions may derive from attributes associated with an incident triggering execution of the playbook or based on other accessible values).

In some embodiments, the IT and security operations application 502 described herein provides a visual playbook editor (for example, as an interface provided by a frontend service 508) that allows users to visually create and modify playbooks. Using a visual playbook editor GUI, for example, users can codify a playbook by creating and manipulating a displayed graph including nodes and edges, where each of the nodes in the graph represents one or more function blocks that each perform one or more defined operations during execution of the playbook, and where the edges represent a control flow among the playbook's function blocks. In this manner, users can craft playbooks that perform complex sequences of operations without having to write some or any of the underlying code. The visual playbook editor interfaces further enable users to supplement or modify the automatically generated code by editing the code associated with a visually designed playbook, as desired.

5.5.1. Playbooks Management

In an embodiment, an IT and security operations application 502 provides one or more playbook management interfaces that enable users to locate and organize playbooks associated with a user's account. A playbook management interface can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

FIG. 6 illustrates an example playbook management interface according to some embodiments. The playbook management interface 600 shown in FIG. 6 includes a playbook list 602. As indicated above, a playbook list 602 includes several columns indicating information about each playbook including, for example, a name of the playbook, one or more labels associated with each playbook, a repository at which the playbook is stored, a category associated with each playbook, and a status of the playbook. In some embodiments, a user can also user interface elements 604 to sort the displayed list of playbooks, to refresh the playbook list, to export and download a copy of one or more playbooks (e.g., including the program code associated with the playbook and other playbook metadata), and to create a new playbook, among other possible operations. A user can also provide input selecting a playbook to view in the visual playbook editor so that the user can modify the selected playbook, if desired. The modification of a playbook using a visual playbook editor is described in more detail hereinafter.

5.5.2. Playbook Creation and Configuration

In some embodiments, users can create a new digital playbook starting from a playbook management interface, as described in reference to FIG. 6, or using another interface provided by the IT and security operations application 502. Using the playbook management interface 600, for example, a user can select the "create new playbook" interface element from interface elements 604. Once a user has provided input requesting the creation of a new playbook, the IT and security operations application 502 causes display of a visual playbook editor interface including a graphical canvas on which users can add nodes representing operations to be performed during execution of the playbook, where the operations are implemented by associated source code that can be automatically generated by the visual playbook editor, and add connections or edges among the nodes defining an order in which the represented operations are to be performed upon execution.

Figure 7:
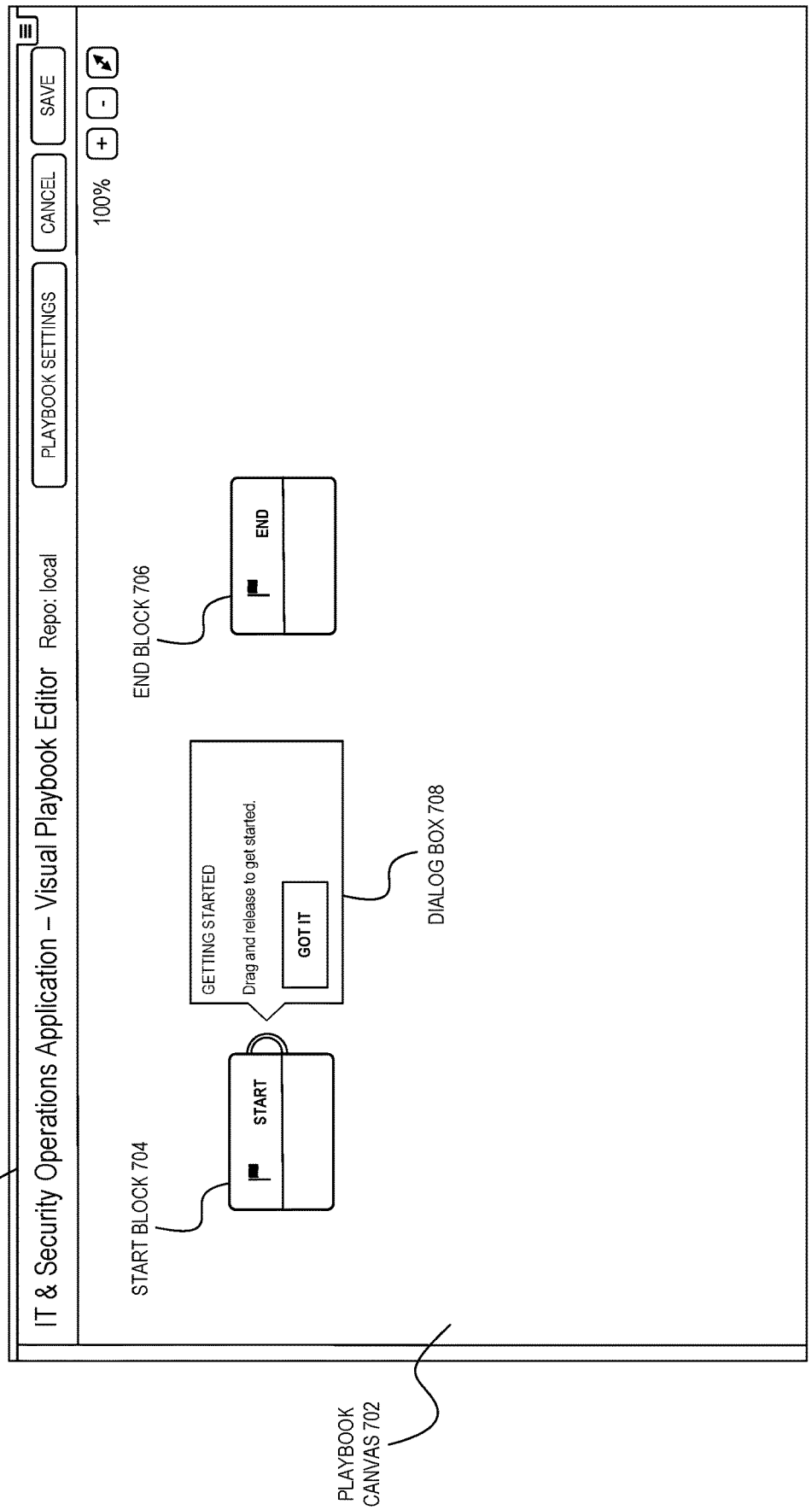
FIG. 7 illustrates an example visual playbook editor interface used to create and modify playbooks within an IT and security operations application according to some embodiments.

FIG. 7 illustrates a visual playbook editor canvas that can be used to visually design a playbook according to some embodiments. As illustrated in FIG. 7, a visual playbook editor interface 700 includes a playbook canvas 702 initially including two nodes corresponding to a start block 704 and an end block 706, respectively, where those nodes represent a start and end point for execution of the playbook under design. In the illustrated example, the visual playbook editor interface 700 further displays an example dialog box 708 instructing a user to select the start block 704 and to create an edge or connection originating from the start block 704 to add a new function block to the playbook. As described in more detail below, the visual playbook editor interface 700 enables users to add various types of function blocks to a playbook including, for example, playbook blocks, decision blocks, filter blocks, action blocks, format blocks, prompt blocks, task blocks, API blocks, etc.

In some embodiments, one type of function block that can be added to a playbook is an action block. Once an action block is added to a playbook, the visual playbook editor interface 700 can guide the user in selecting an action to be performed when the action block is encountered during execution of the playbook. A user can optionally further configure an action block using various items of data accessible to the action block including, for example, data stored as part of an incident, events and artifacts associated with an incident, as well as other output variables generated by other playbook function blocks. For example, if a user adds an action block that performs the operation of geolocating an IP address, a user may configure the action block to use an IP address corresponding to a selected artifact of an incident that initiated the playbook's execution or based on an IP address obtained by an upstream function block using other processes.

In an embodiment, another type of function block that a user can add to a playbook is a prompt block. A prompt block is generally used to add user interaction to a playbook by causing information to be requested from one or more users at a particular point during execution of the playbook. The information requested and provided by a user can be used by other downstream function blocks of the playbook. For example, a playbook might include an action block that detects the presence of potentially malicious IP addresses, further include a serially-connected prompt block that presents information to a user about the detected potentially malicious IP address and requests a yes/no response from the user indicating whether the IP address should be blocked, followed by another serially-connected action block that either blocks the IP address at a firewall or not depending on the input received from a user in response to the prompt block.

In some embodiments, a prompt block is associated with various properties that can be configured by a user using a visual playbook editor including, for example, configurations indicating a prompt approver, a required response time, a message prompt, and a response type. The assignment of a prompt approver indicates an individual user or user role (e.g., administrator, engineer, manager) that is to receive the prompt to be acted upon during execution of the corresponding playbook. A required response time indicates an amount of time that an assigned approver or set of approvers have to complete the prompt, for example, by accessing the prompt and providing any requested information or otherwise performing actions specified by the prompt. A message prompt is information that is displayed to a user when the user accesses an assigned prompt (for example, a message prompt can be presented as part of a GUI interface element displayed to a user accessing an assigned prompt). A response type indicates a type of acceptable response that can be provided by a user to successfully complete the prompt (for example, a yes/no response, a numerical value response, a text-based response, or a response from an enumerated list of options).

In some embodiments, a user accesses a prompt that has been generated for the user during execution of a playbook via a notification presented in a "mission control" or other type of interface of the IT and security operations application 502. In response to a user accessing an assigned prompt (for example, by providing input selecting a notification indicating the existence of the prompt), the IT and security operations application 502 causes display of an interface element that includes a message indicating what information is being requested from the user. A user assigned a prompt can either complete the prompt (that is, access the prompt and provide any requested data), delegate the prompt to a different user, or allow the deadline for responding to the prompt to time out. A prompt is successfully completed when either the designated user, or a user to whom the prompt is delegated, completes the prompt. If a prompt is assigned to a group of users, a prompt can be successfully completed when either at least one user of the group completes the prompt, or when all users of the group complete the prompt, depending on how the prompt is configured.

In some embodiments, yet another type of function block that can be added to a playbook is a task block. A task block is generally configured to send a message to a user or group of users to be acknowledged by the users. A task block can be further configured by specifying an approver (that is, a user or user role to whom the task is sent), a response deadline (for example, expressed in minutes from the time at which the task is generated), a message to be displayed to the user(s), among other possible configurations.

In an embodiment, yet another type of function block that can be added to playbooks in a visual playbook editor is a decision block. A decision block generally can be used to control program flow associated with the playbook. For example, during execution of a playbook, a decision block can be used to determine whether the execution flow proceeds next to a block A or to a block B (or block C, etc.) depending on the outcome of one or more logical conditions defined by the decision block. These logical conditions, for example, can be based on comparisons involving artifact data, container properties, date functions, action results, among other possible types of input data. The use of a decision block in a playbook, for example, is conceptually similar to an if-then conditional statement found in high-level programming languages.

In some embodiments, yet another type of function block that can be included in a playbook is an API block. An API block can be used, for example, to set various parameters associated with an incident container upon which the playbook is executing or to interact with the IT and security operations application 502 in other ways supported by an associated API. For example, an API block can be used to set a severity level associated with an incident container, to indicate that the incident container is resolved, to associate a label with the incident container, add a comment to the container, among other possible operations.

In an embodiment, the creation of a graph representing a playbook includes the creation of connections between function blocks, where the connections are represented by edges that visually connect the nodes of the graph representing the collection of function blocks. These connections among the playbook function blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

In an embodiment, users can create connections that link function blocks of a playbook in parallel. For example, a user can create a connection that links the output of a function block A to the input of a function block B and separately to the input of a function block C. In this example, the IT and security operations application 502 can execute the operations defined by function blocks B and C in parallel, although the exact ordering of the execution may not be guaranteed. For some playbooks, the execution of two or more function blocks in parallel may provide a performance benefit compared to executing the function blocks serially.

In an embodiment, the visual representation of a playbook in a visual playbook editor, comprising a collection of nodes and edges, can be modified over time. Users can provide input via the visual playbook editor interface, for example, to rearrange the location of and connection between nodes in the graph and the visual playbook editor can route existing connections among the nodes accordingly such that an easily understandable visual representation is provided. In some embodiments, multiple nodes can be selected and moved around the canvas as a group.

5.5.3. Playbook Execution

Once a user has codified a playbook using a visual playbook editor or other interface, the playbook can be saved (for example, in a multi-tenant database 536 and in association with one or more user accounts) and run by the IT and security operations application 502 on-demand. As illustrated in the example playbooks above, a playbook includes a "start" block that is associated with source code that begins execution of the playbook. More particularly, the IT and security operations application 502 executes the function represented by the start block for a playbook with container context comprising data about the incident against which the playbook is executed, where the container context may be derived from input data from one or more configured data sources. A playbook can be executed manually in response to a user providing input requesting execution of the playbook, or playbooks can be executed automatically in response to the IT and security operations application 502 obtaining input events matching certain criteria. In embodiments where the source code associated with a playbook is based on an interpreted programming language (for example, such as the Python programming language), the IT and security operations application 502 can execute the source code represented by the playbook using an interpreter and without compiling the source code into compiled code. In other examples, the source code associated with a playbook can first be compiled into byte code or machine code the execution of which can be invoked by the IT and security operations application 502.

5.6. Workbooks

Some IT and security operations applications 502, such as the SPLUNK PHANTOM™ application, include the ability for users to create, customize, and use "workbooks." At a high level, a workbook enables users to codify an organization's standard operating procedures (SOPs) and other defined processes for responding to incidents (for example, security threats, operational issues, etc.) within an IT environment into reusable templates. In some embodiments, a workbook is comprised of one or more user-defined phases (for example, detection, analysis, containment, eradication, recovery, and so forth, in the context of a security investigation), where each phase includes one or more user-defined tasks to be performed by assigned analysts or other users. A workbook in this way defines an overall procedure that helps guide users of an IT and security operations application through the process of responding to, documenting, and reporting incidents when they occur. Different workbook templates can be defined for responding to different types of incidents—for example, one workbook template might be created to help analysts investigate and respond to computer security incidents, while another workbook template can be created to help analysts recover from and report significant hardware failures, and so forth. In some examples, workbook templates can be created to help analysts carry out various industry-wide SOPs such as the NIST-800-61 standard for responding to computer security incidents and others.

In some embodiments, each task defined as part of a workbook template can be optionally associated with one or more automated actions or playbooks that can be executed by the IT and security operations application 502 to help to carry out the task. For example, if a workbook includes a task of obtaining a particular log file at one or more endpoint devices associated with an incident, that task can be associated with an automated action or playbook for obtaining the relevant log files without additional manual user involvement. A user may specify a set of one or more executable actions, playbooks, or a combination thereof, in association with some or all of a workbook's tasks as part of the workbook template configuration process. In some embodiments, the IT and security operations application 502 can additionally or alternatively automatically associate actions and playbooks with particular tasks, for example, by matching tasks to possible actions/playbooks based on an analysis of the text or other attributes associated with phase/task definitions.

In some embodiments, an IT and security operations application 502 includes various GUIs that enable users to interact with workbooks. For example, in response to the IT and security operations application 502 identifying an occurrence of a particular type of incident, the IT and security operations application 502 may instantiate a new workbook based on a previously defined workbook template associated with that type of incident (for example, if a malware attack is identified, the IT and security operations application 502 can create a new workbook based on a computer security incident workbook template). Once a new workbook is created, analysts can use these interfaces to complete assigned tasks and to view the workbook's progress. Users can perform assigned workbook tasks, for example, either by manually performing the tasks or by selecting one or more automated actions or playbooks associated with the task. Icons or other graphical elements representing the automated actions and playbooks associated with the various workbook tasks can be graphically displayed, for example, such that a user can execute associated actions/playbooks simply by selecting a corresponding interface element in a workbook GUI.

In some embodiments, an IT and security operations application 502 further optimizes the presentation of executable actions and playbooks displayed in connection with workbook tasks. For example, instead of displaying the actions and playbooks associated with workbook tasks in an arbitrary order, the IT and security operations application 502 can monitor and log the efficacy of each action and playbook over time and use such data to determine a prioritized order in which to display the actions/playbooks in a workbook (or determine whether to display particular actions or playbooks at all). For example, when an action associated with a task is executed, the IT and security operations application 502 can monitor the action's execution and determine whether the action executed successfully (for example, if an action is configured to terminate a process running on an endpoint device, the IT and security operations application 502 can determine whether the action was actually able to successfully connect to the endpoint device and terminate the process). This information can be collected over time and used, for example, to display actions/playbooks associated with various tasks in an order that reflects how successful each action/playbook historically has been in completing the task so that analysts can be guided to those actions/playbooks most likely to successfully complete a task. In some embodiments, this data can be collected and analyzed on a per-tenant basis and, in some embodiments, collected and analyzed across some or all tenants of the IT and security operations application 502.

Figure 8:
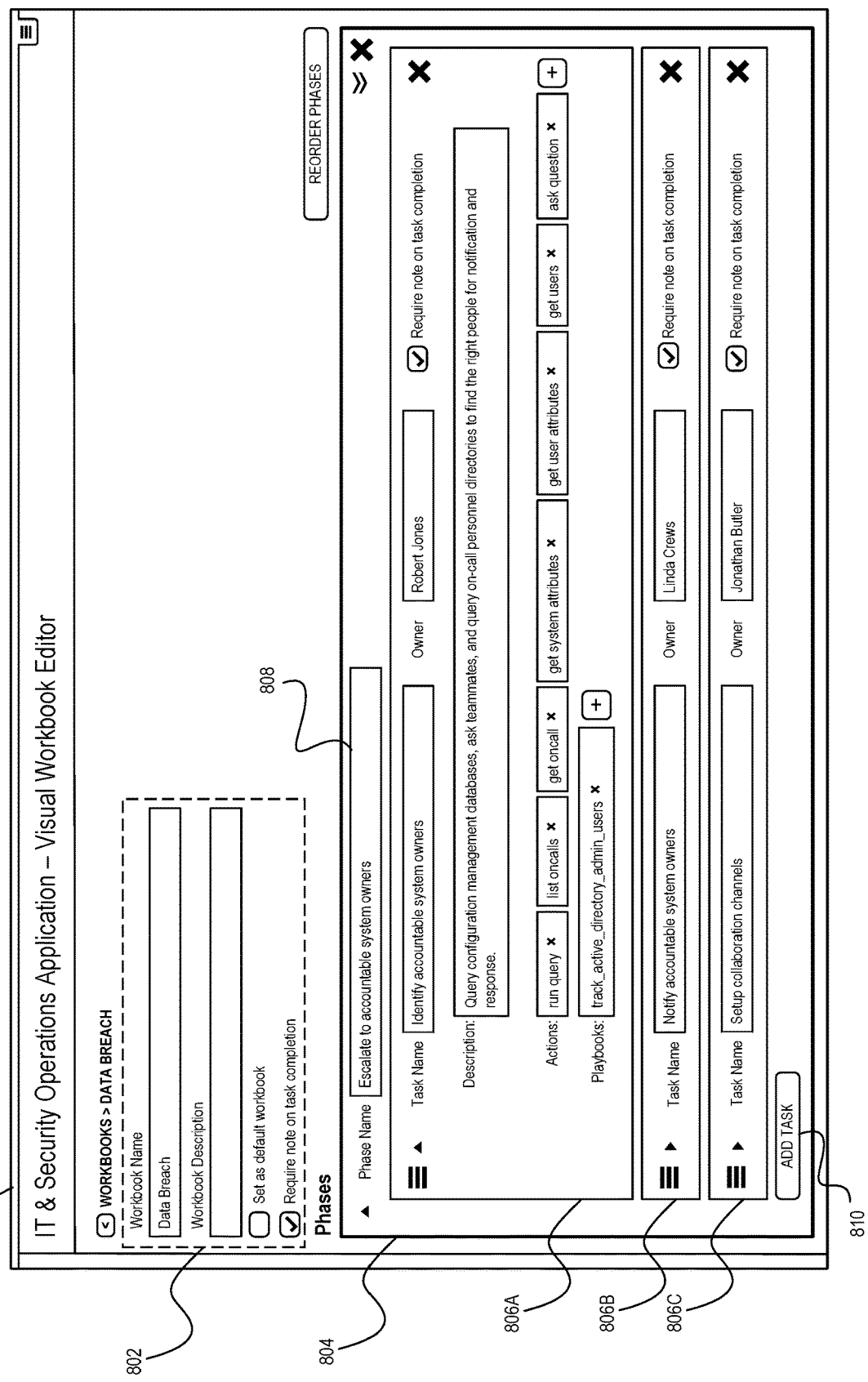
FIG. 8 illustrates an example workbook template configuration interface used to create a workbook within an IT and security operations application according to some embodiments.

As indicated above, an IT and security operations application 502 may include various GUIs that can be used to define workbook templates and to interact with workbook instances. FIG. 8 illustrates an example workbook template configuration interface used to create a workbook template according to some embodiments. As illustrated in FIG. 8, a workbook template configuration interface 800 includes interface elements for specifying information about a workbook template generally, and additional interface elements used to define the phases and tasks associated with the workbook.

In some embodiments, the workbook template configuration interface 800 includes a set of workbook information options 802, including fields for entry of a workbook name and workbook description, an interface element that can be used to set the current workbook as a default workbook, and an interface element that can be used to designate whether users are required to create a note upon completion of workbook tasks. In some embodiments, the workbook template configuration interface 800 further includes a phases definition panel 804. The example shown in FIG. 8 illustrates the definition of a single phase; however, a workbook template generally can include any number of separate phases as desired by the user. As illustrated in FIG. 8, the phases definition panel 804 include a field 808 for entry of a phase name and an add task button 810 used to add tasks to the phase. In FIG. 8, an example "Data Breach" workbook template includes a phase named "Escalate to accountable system owners." The phase named "Escalate to accountable system owners" includes three tasks: a task 1906A named "Identify accountable system owners," a task 806B named "Notify accountable system owners," and a task 806C named "Setup collaboration channels." Each of the tasks 806A, . . . , 806C includes fields for the task name and the owner (e.g., a user who can be designated as being responsible for the associated task), and a selector button to designate that a notification should be sent upon completion of the task. In response to selecting a specific task within a phase, the workbook editor displays additional options for the corresponding task. As illustrated in FIG. 8, selected task 806A includes a field for entry of text for a description of the task, in addition to options to add or remove executable actions and playbooks. The set of executable actions associated with task 806A includes the track_active_directory_admin_users playbook, as well as individual actions, including run query, list oncalls, get oncall, get system attributes, get user attributes, get users, and ask question.

Figure 9:
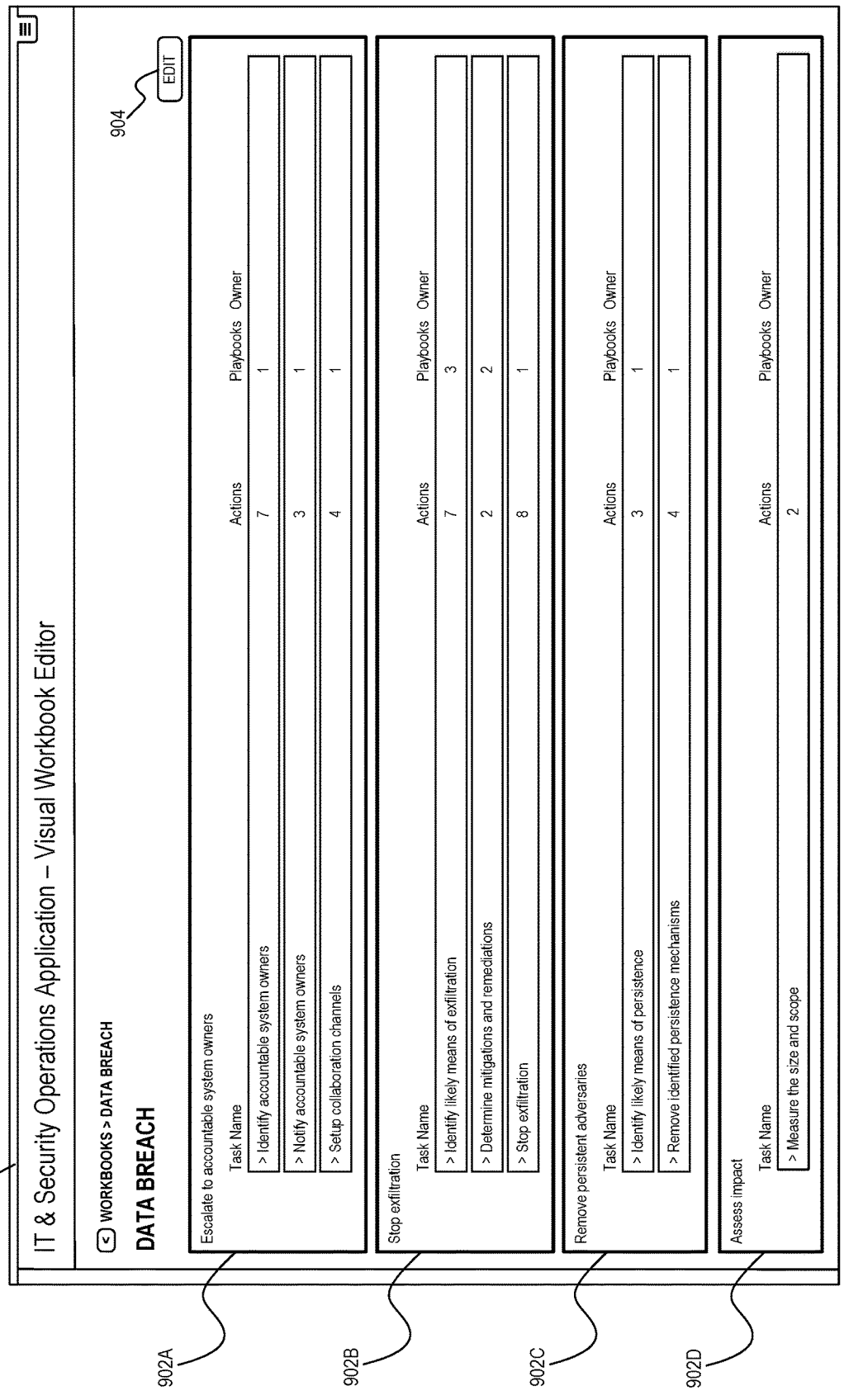
FIG. 9 illustrates an example workbook template review interface displaying information about a defined workbook template according to some embodiments.

FIG. 9 illustrates an example workbook template review interface displaying information related to a defined workbook template according to some embodiments. For example, as illustrated in the workbook template review interface 900 shown in FIG. 9, the phases of a created "Data Breach" workbook template include: a phase 902A labeled "Escalate to accountable system owners," a phase 902B labeled "Stop the exfiltration," a phase 902C labeled "Remove persistent adversaries," and a phase 902D labeled "Assess impact." Additional phases not pictured can include, for example, phases labeled "Report to appropriate stakeholders" and "Prevent future breaches." As illustrated in FIG. 9, the tasks associated with the phase 902B include: "Identify likely means of exfiltration," "Determine mitigations and remediations," and "Stop exfiltration"; the tasks associated with phase 902C include: "Identify likely means of persistence" and "Removed identified persistence mechanisms"; and the task for phase 902D include: "Measure the size and scope." The workbook template review interface 900 further displays, for each task, an indication of a number of actions and playbooks associated with the task, as well as an owner of the task, if any. A user can select an edit button 904 to further configure the workbook template, if desired.

Figure 10:
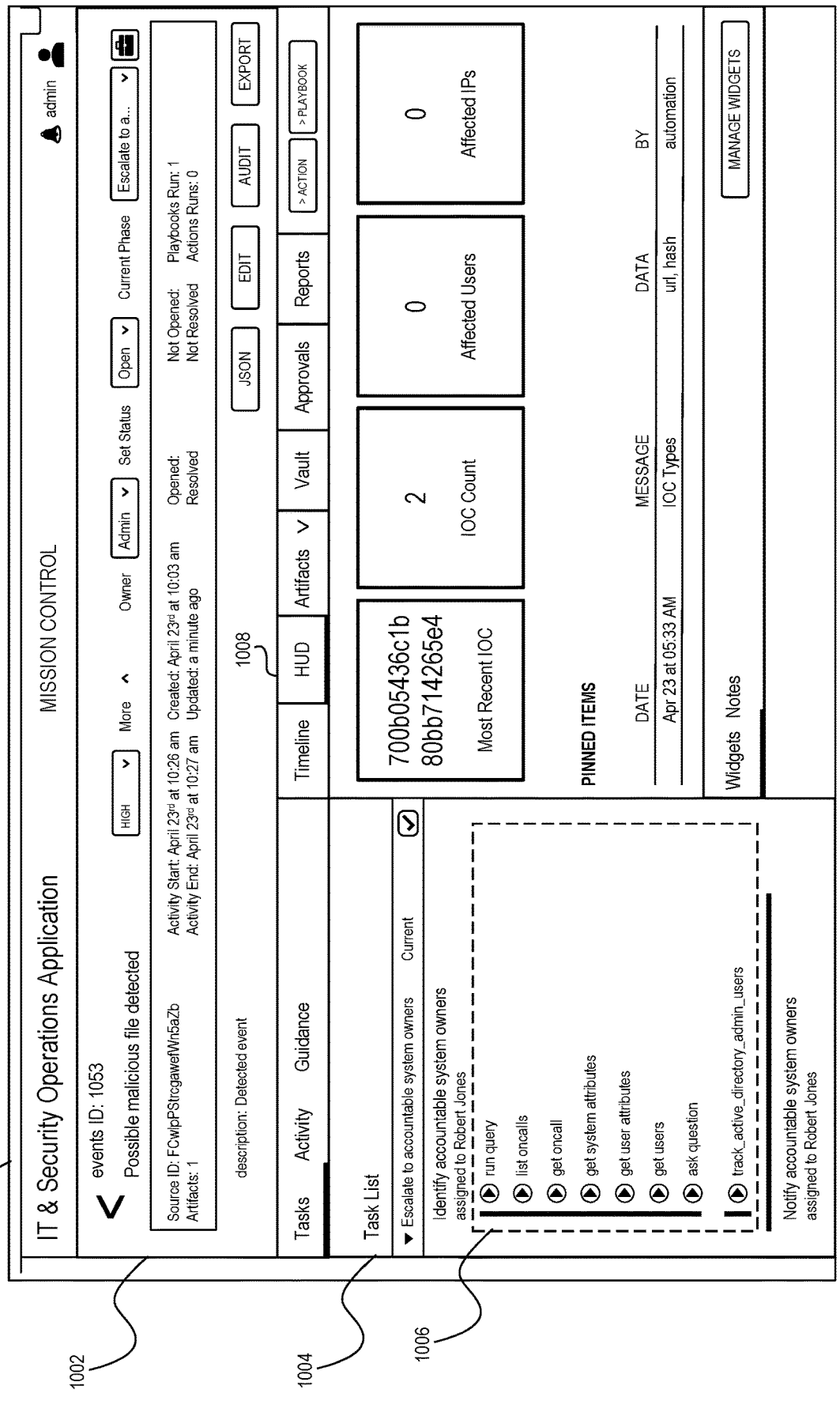
FIG. 10 illustrates an example "mission control" interface of an IT and security operations application displaying information related to an occurrence of an incident associated with a monitored IT environment according to some embodiments.

FIG. 10 illustrates an example of a "mission control" interface of an IT and security operations application (e.g., IT and security operations application 502) displaying information related to an occurrence of an incident in an IT environment according to some embodiments. In some embodiments, the mission control interface 1000 displays one or more executable actions for responding to the incident as part of a workbook that is generated based on the identified incident. The mission control interface 1020 shown in FIG. 10 includes, for example, an event information panel 1002, a tasks panel 1004, a set of suggested executable actions 1006 associated with a particular task, and a head-up display (HUD) panel 1008.

5.7. Extension Framework

In some embodiments, the extension framework 554 allows users to extend the user interfaces, data content, and functionality of an IT and security operations application 502 in various ways to enhance and enrich users' workflow and investigative experiences. Example types of extensions enabled by the extension framework 554 include modifying or supplementing GUI elements (including, e.g., tabs, menu items, tables, dashboards, visualizations, etc.) and other components (including, e.g., response templates, connectors, playbooks, etc.), where users can implement these extensions at pre-defined extension points of the IT and security operations application 502. In some embodiments, the extension framework 554 further includes a data integration system that provides users with mechanisms to integrate data from external applications, services, or other data sources into their plugins (e.g., to visualize data from any external data source in the IT and security operations application 502 or to otherwise enhance users' investigative experience with data originating outside of the IT and security operations application or data intake and query system 102).

The types of users that might be interested in creating plugins using an extension framework 554 include, for example, development teams associated with a data intake and query system 102, developers of third-party applications or services relevant to the IT and security operations application 502 (e.g., developers of VM management software, cloud computing resource management software, etc.), and other general users of the IT and security operations application 502. Users of the IT and security operations application 502 might, for example, desire to enhance their own workflows and other processes by enabling internal user information lookups, creating internal ticketing system postings, or enabling any other desired visualizations or actions at various points in the IT and security operations application. In some embodiments, the extension framework 554 enables users to create plugins using "No-Code" development tools, e.g., where users can define the specifications for custom plugin visualizations, data integrations, and other plugin components without direct user coding (e.g., without the direct creation of JavaScript code, JSON specifications, or other data comprising a plugin), although users can also modify the underlying plugin components as desired.

As one example use case for a plugin, consider a cybersecurity company that provides security software that is known to be used by users of the IT and security operations application 502. In this example, developers of the security software may desire for certain information collected or generated by the security software to be visible at various points within the IT and security operations application 502, e.g., to create a tighter integration of the two software applications. The developers, for example, might desire for users of the IT and security operations application 502 to be able to view endpoint information, malware information, etc., collected by the security application when users view various visualizations or other incident information in the IT and security operations application 502 that is associated with the data collected by the security software.

In some embodiments, developers associated with the cybersecurity company can use the extension framework 554 to create a plugin that integrates the data collected by the security application with the IT and security operations application 502. Users who subscribe to the plugin can then view relevant data or perform other actions when the users navigate to defined extension points of the IT and security operations application 502. Numerous other such use cases exist for a wide variety of applications, data sources, and desired functionality related to an IT and security operations application 502. Among other benefits, the ability to create and use plugins to an IT and security operations application 502 enables security teams to efficiently investigate and remediate a wide variety of incidents that occur from time to time in IT environments, thereby improving the overall security and operation of the IT environments.

5.8. Secure Tunnel Service

In some embodiments, components external to the IT and security operations application 502 interface with an intermediary secure tunnel service 546 to send communications to, and to receive communications from, an IT and security operations application 502 running in a provider network 504. In some embodiments, the secure tunnel service 546 operates as a service that establishes WebSocket or other types of secure connections to endpoint devices. As one example, the secure tunnel service 546 can establish a first secure connection to the IT and security operations application 502 and a second secure connection to an on-premises proxy 512 and an on-premises action execution agent 520 executing in a tenant network 510A, where each connection is established using a handshake technique with the respective endpoints. Once established, the connection enables two-way communications between the IT and security operations application 502 (e.g., via a separate proxy implemented by the IT and security operations application 502) and the on-premises action execution agent 520 without the need to open a port in a firewall or perform other configurations to a network associated with the tenant network 510A. In some embodiments, the secure tunnel service 546 is a cloud-based service (e.g., executing using computing resources provided by a provider network 504) configured to transfer data between an IT and security operations application 502 and computing devices located on networks external to the provider network 504, including on-premises action execution agents, mobile devices, and the like. In other embodiments, the secure tunnel service 546 executes using computing resources located outside of a cloud-based environment.

In some embodiments, the secure tunnel service 546 performs authentication operations with other components (e.g., the IT and security operations application 502 and an on-premises proxy 512 or on-premises action execution agent 520) to establish trust and then establishes secure communications channels with those components, where the secure tunnel service 546 and other components transmit secure communications using the secure communications channels. In some embodiments, the secure tunnel service 546 provides end-to-end encryption (E2EE) of communications between the IT and security operations application 502 and an on-premises action execution agent 520 via an on-premises proxy 512 by transmitting one or more encrypted data packets between the IT and security operations application 502 and the on-premises proxy 512. In some embodiments, communications sent through the secure tunnel service 546 are in the form of data packets, where each data packet includes, for example, a payload and a device identifier for a destination device that is to receive the data packet. In other embodiments, the data packet can also include a device identifier for the source device or an instance identifier that indicates an IT and security operations application instance associated with the data packet. In some embodiments, the data packet is encrypted prior to being transmitted to the secure tunnel service 546, e.g., using a public key of an asymmetric key pair generated by a receiving device. While in some embodiments, the secure tunnel service 546 decrypts the data packet before sending the data packet to its intended destination, in other embodiments, the secure tunnel service 546 forwards the encrypted data packet to its intended destination without performing a decryption process.

In some embodiments, the IT and security operations application 502 and on-premises proxy 512 communicates with the secure tunnel service 546 across network(s) 550. As indicated herein, the networks 550 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some embodiments, after an on-premises action execution agent 520 is installed and executed within a tenant network 510A, the on-premises action execution agent 520 uses an on-premises proxy 512 to initiate a process to establish a secure connection (e.g., a gRPC Remote Procedure Calls (gRPC) over HTTP/2 connection) with a secure tunnel service 546. For example, the secure tunnel service 546 may establish the secure connection and associate the secure connection with a device identifier for the on-premises proxy 512.

In some embodiments, the secure tunnel service 546 maintains a database that stores document data structures and optionally stores keys. In some embodiments, the database can be a structure query language (SQL) database, or a NoSQL database, such as an AMAZON® DynamoDB. In some embodiments, the database includes a key store that stores encryption keys, including single-use session keys and long-term keys associated with devices that send E2EE communications. In other embodiments, the secure tunnel service 546 does not store encryption keys and routes messages without the use of a key store. In some embodiments, the database also includes a routing table that includes address information associated with devices registered with the secure tunnel service 546 with which the service has established secure communications. The secure tunnel service 546, for example, can send queries to the database to determine, based on a device identifier in a particular data packet, the address of the intended recipient of the particular data packet.

As illustrated in FIG. 5, the secure tunnel service 546 may not directly communicate with an on-premises action execution agent 520 but communicate instead through an on-premises proxy 512. The on-premises proxy 512 is a process executing in the tenant network 510A and that operates as a gateway between the secure tunnel service 546 and the IT and security operations application 502. The on-premises proxy 512 is configured to receive messages from the secure tunnel service 546 and forward the messages to the on-premises action execution agent 520 for processing. The on-premises proxy 512 can also be configured to generate and send messages (e.g., notifications, alerts, etc.) IT and security operations application 502 via the secure tunnel service 546. In some embodiments, the on-premises proxy 512 can also send messages to configured mobile devices in accordance with a push notification service, such as the APPLE® Push Notification service (APN), or GOOGLE® Cloud Messaging (GCM). In some embodiments, the on-premises proxy 512 is configured to perform the management, generation, and registration of encryption keys used to communicate with the secure tunnel service 546.

6.0. On-Premises Action Execution Agents

The present disclosure relates to methods, apparatus, systems, and non-transitory computer-readable storage media for providing on-premises action execution agents used to execute orchestration, automation, and response (OAR) actions in users' IT environments using an IT and security operations application. According to embodiments, an on-premises action execution agent can be used to execute actions involving computing resources (e.g., computing devices, servers, applications, services, etc.) located in users' on-premises IT environments, where such resources may be located behind a firewall or otherwise not directly accessible to an IT and security operations application running in a cloud-based environment or elsewhere. In some embodiments, an intermediary secure tunnel service is used to establish secure connections between an IT and security operations application and on-premises action execution agents, thereby enabling the encrypted transfer of credentials, API tokens, and other sensitive information used by an on-premises action execution agent to carry out instructed actions. The actions executed by an on-premises action execution agent can include on-demand actions initiated by a user (e.g., via a web console provided by a cloud-based IT and security operations application) and automated actions included, e.g., as part of a playbook that is executed responsive to the identification of certain types of incidents in users' IT environments.

Figure 11:
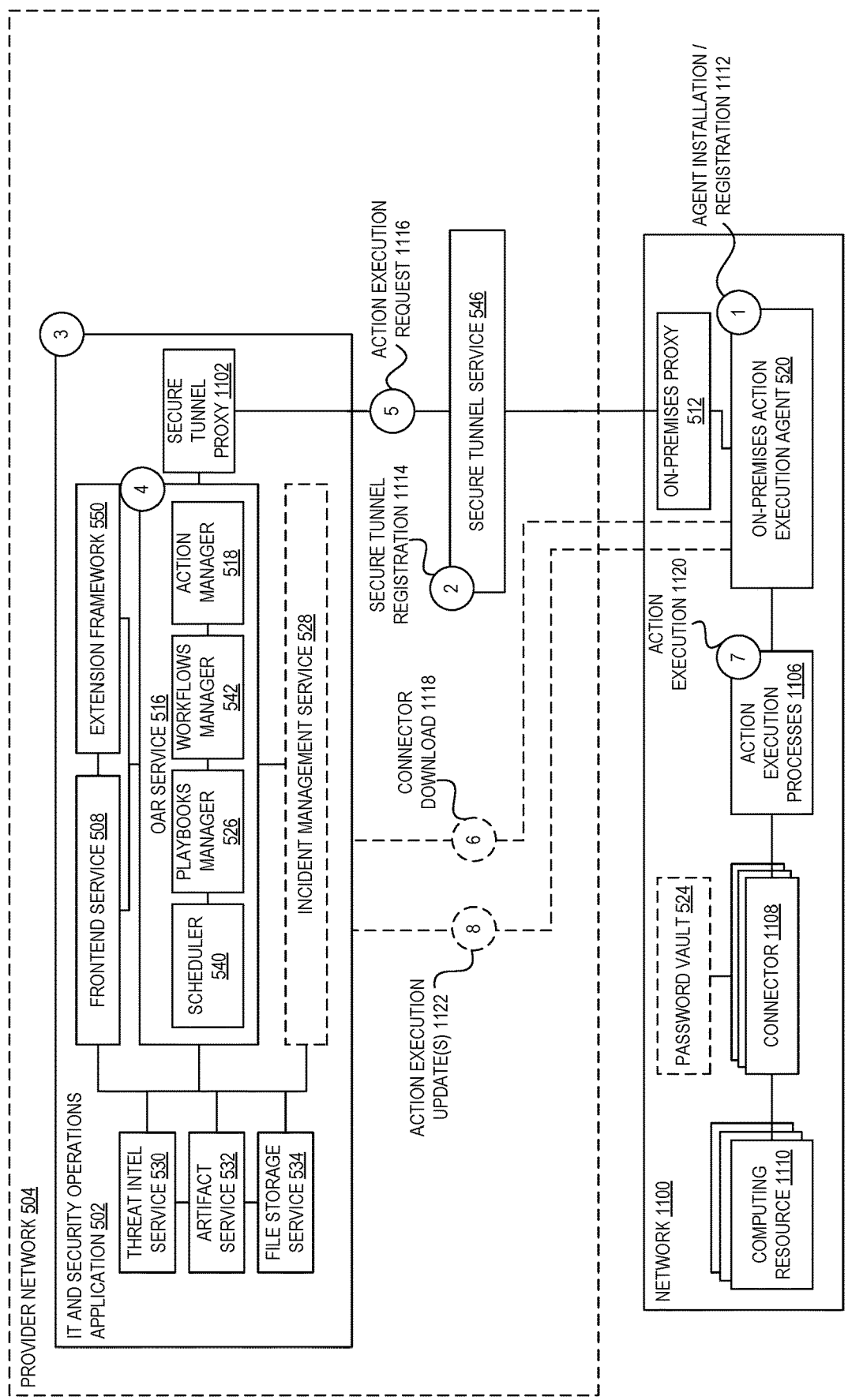
FIG. 11 illustrates an example computing environment in which an on-premises action execution agent is used to execute orchestration, automation, and response (OAR) actions in an on-premises network according to some embodiments.

FIG. 11 illustrates an example computing environment in which an on-premises action execution agent is used to execute OAR actions in an on-premises network according to some embodiments. Similar to FIG. 5, in FIG. 11, an on-premises action execution agent 520 is installed in a network 1100 and used to execute actions against computing resources 1110 in the network responsive to action requests received from the IT and security operations application 502 running in the provider network 504. In some embodiments, an on-premises action execution agent 520 can also execute actions against computing resources 1110 that are external to the network 1100— for example, the on-premises action execution agent 520 can execute actions against computing devices, applications, or services located in provider network 504, in other cloud-based networks, or in any other network external to network 1100. As described in more detail herein, an on-premises action execution agent 520 generally includes, among other features, functionality for downloading and storing connectors 1108 used to execute actions against various types of computing resources 1110, managing concurrency and synchronization of connectors 1108 and action executions, managing the local execution of actions using the connectors 1108, and communicating with the IT and security operations application 502 via both the secure tunnel service 546 and API calls sent directly to API endpoints provided by the IT and security operations application 502.

In some embodiments, an on-premises action execution agent 520 launches an action execution process 1106 each time an action is requested to be executed using a connector 1108. The on-premises action execution agent 520 may communicate with these launched action execution processes 1106 to manage, e.g., local interprocess communication (IPC) sessions for each connector run. In some embodiments, responsive to requested action executions, the action execution processes 1106 managed by the on-premises action execution agent 520 initialize an execution environment (e.g., an interpreter, runtime environment, API functions, etc.) used to execute the actions and to communicate with other system components (e.g., with computing resources 1110 and with the IT and security operations application 502). The communications with the IT and security operations application 502 can include, for example, requests to download connectors, to modify incident containers (e.g., to update incident status values, to obtain or add files to incident containers, etc.), and to send action execution status updates and final action results. In some embodiments, the IT and security operations application 502 implements corresponding APIs including, for example, an API enabling on-premises action execution agents to request and download connectors, an API to receive progress and status updates during execution of a connector, an API to receive a final result of connector execution (e.g., success, failure, result data, etc.), an API to receive log, metric, or audit data, an API to receive initial agent registration and pairing requests with the secure tunnel service 546, etc. Additional details related to the installation, registration, and use of on-premises action execution agents is described in relation to the numbered circles "1"-"8" in FIG. 11.

Figure 12:
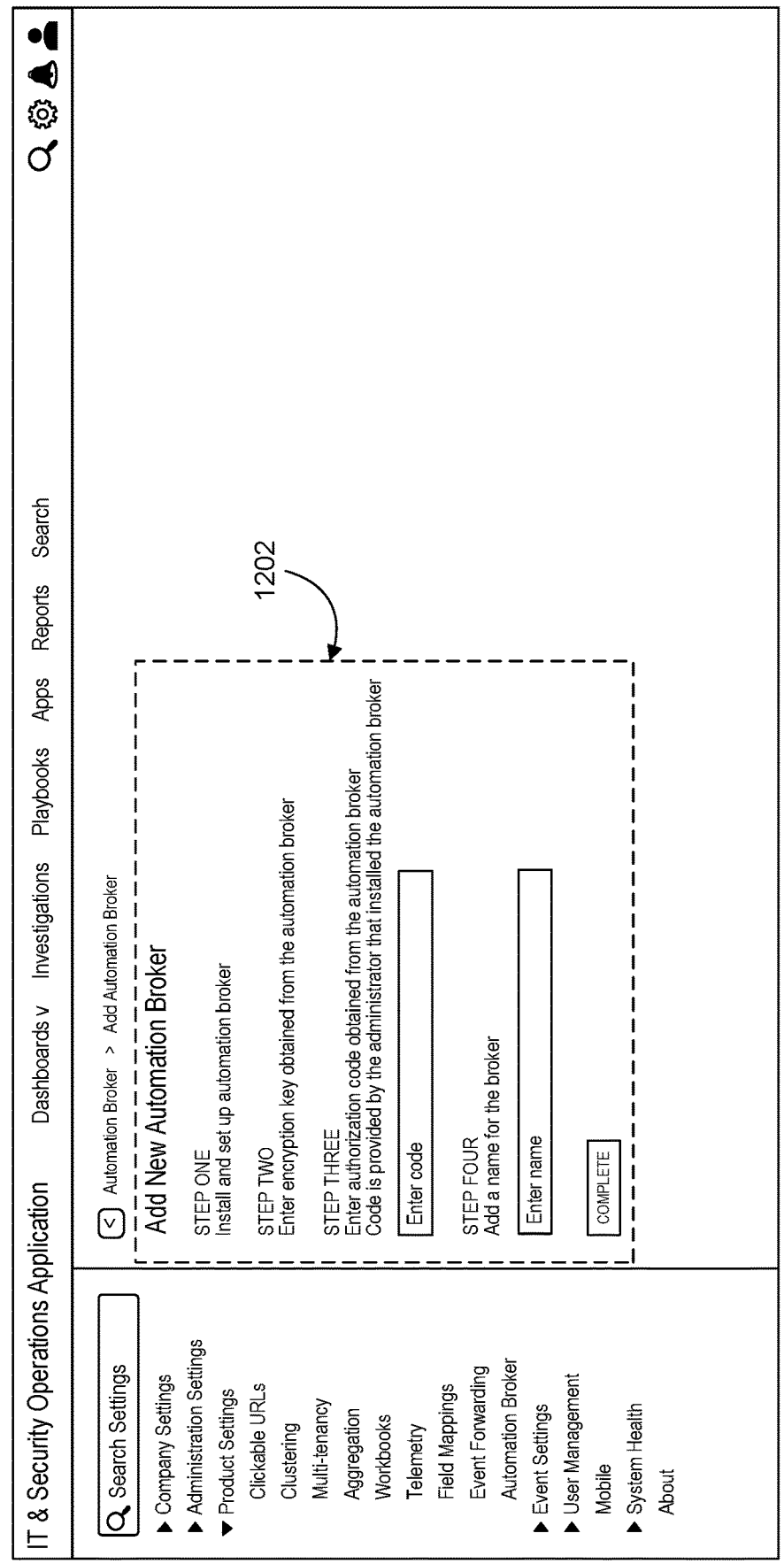
FIG. 12 illustrates an example on-premises action execution agent registration interface provided by an IT and security operations application according to some embodiments.

In some embodiments, at circle "1" in FIG. 11, a user obtains, installs, and registers 1112 an on-premises action execution agent 520 including an on-premises proxy 512. In some embodiments, the on-premises action execution agent 520 is made available as a downloadable container image, VM image, or other executable file that enables users to initiate an installation process once the agent is stored on a server or other computing resource in the network 1100. Once initiated, the installation process performs various setup configurations including, for example, generating an asymmetric key pair used to secure communications sent to and from the agent and further generating an authorization code used to pair the on-premises action execution agent 520 with a secure tunnel service 546. As illustrated in FIG. 12 below, for example, once the encryption keys and authorization code are generated as part of the installation process, a user can login to the IT and security operations application 502 using a web console or other provided interface and provide input associating the on-premises action execution agent 520 with the user's IT environment configuration in the application 502. For example, the user can use such interfaces to provide a public key from the asymmetric key pair and the authorization code generated by the agent 520, where the IT and security operations application 502 then uses these values to complete pairing processes between the IT and security operations application 502 and the secure tunnel service 546 and between the secure tunnel service 546 and the on-premises proxy 512.

In some embodiments, the IT and security operations application 502 enables users to register multiple on-premises action execution agents across a same network or across multiple separate tenant networks. For example, a network 1100 might be associated with multiple subnets and a user might then install a separate on-premises action execution agent within each subnet. As another example, a user might install multiple on-premises action execution agents within a network 1100 for redundancy or scaling purposes. For example, a user might install multiple on-premises action execution agents 520 and configure the IT and security operations application 502 to distribute action execution requests among the plurality of agents for load balancing purposes. The IT and security operations application 502 can also be configured to failover action execution requests from one agent to another in the case of agent failures in an IT environment including multiple agents. In other examples, users may also distribute the assignment of computing resources within an IT environment among a plurality of on-premises action execution agents for load balancing purposes, whether such resources are spread across separate subnets or not.

In some embodiments, a registered on-premises action execution agent can also be unregistered with the IT and security operations application 502 at a later point in time, if desired. Responsive to receiving a request to unregister an on-premises action execution agent, the IT and security operations application 502 sends a command to the on-premises action execution agent that causes the agent to delete any user-specific encryption keypairs and other data from local storage and to teardown any established connections with the secure tunnel service 546.

In some embodiments, at circle "2," the on-premises action execution agent 520 is registered 1114 with the secure tunnel service 546. As indicated above, the registration of the on-premises action execution agent can involve the on-premises action execution agent 520 obtaining an authorization code from the secure tunnel service 546, where the authorization code is then provided to the IT and security operations application 502 and used to complete registration of the agent with the secure tunnel service 546. FIG. 12, for example, illustrates an example on-premises action execution agent registration interface provided by an IT and security operations application according to some embodiments. As shown, the GUI 1200 includes instructions 1202 guiding the user through the installation and registration processes including an initial installation and setup step. The instructions, for example, can be include instructions and a link to a location where the agent installation file can be downloaded and installed in a user's IT environment.

In some embodiments, the instructions 1202 further include interface elements that enable a user to enter an encryption key and authorization code obtained from the agent during setup. As indicated above, the provided encryption key can correspond to a public key of a public/private key pair generated by the agent, where the public key can be used to encrypt messages sent to the agent such that only the agent, in possession of the private key, can decrypt the messages. In some embodiments, the authorization code is initially obtained by the on-premises action execution agent from the secure tunnel service 546 and used to authenticate the agent with the secure tunnel service 546. As shown, a user can also specify a user-friendly name for the on-premises action execution agent being configured, where the name can be used to refer to the agent in other interfaces of the IT and security operations application 502.

FIG. 13 illustrates an example interface displaying a list of registered on-premises action execution agents according to some embodiments. As shown, the GUI 1300 includes a list 1302 displaying on-premises action execution agents that have been registered in association with a user's account with the IT and security operations application 502. In some embodiments, the information displayed in association with the registered on-premises action execution agents in the list 1302 includes a name of each agent, a date and time at which each agent was created or registered, a date and time at which each agent was last updated, a status of each agent (e.g., whether it is active or inactive), a version number associated with each agent, and a number of days since the encryption keys associated with each agent were last rotated, among other possible information. In some embodiments, the GUI 1300 further includes interface elements that enable a user to select one of the registered on-premises action execution agents as a default agent to be used for custom playbooks created by a user, where a different agent can be specified later if desired.

Figure 14:
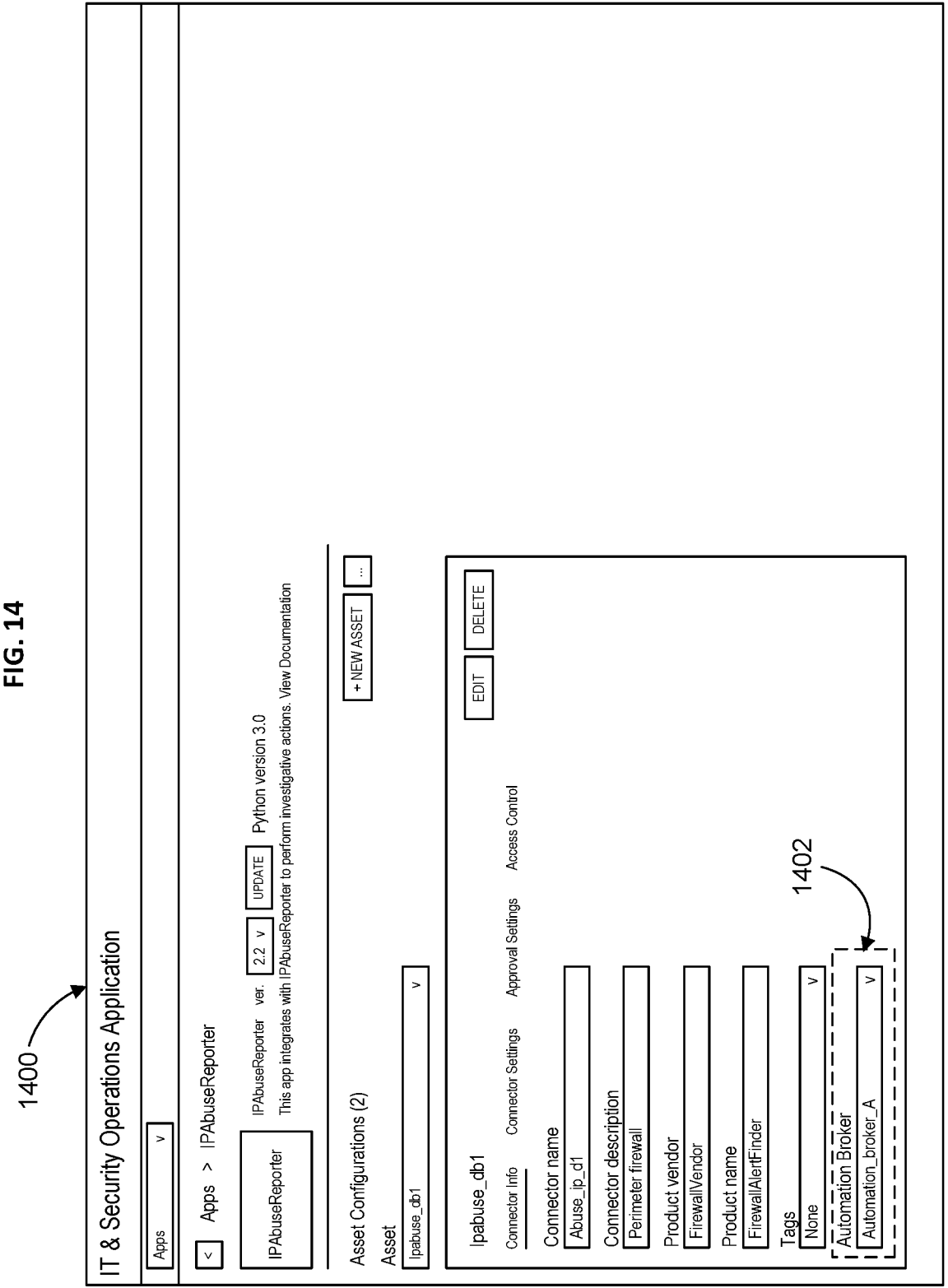
FIG. 14 illustrates an example computing resource configuration interface enabling an assignment of an on-premises action execution agent to a computing resource according to some embodiments.

FIG. 14 illustrates an example computing resource configuration interface enabling an assignment of an on-premises action execution agent to a computing resource according to some embodiments. As shown, the GUI 1400 provides interface elements that enable a user to configure a computing resource in association with a connector provided by the IT and security operations application 502 (e.g., a connector for a particular type of computing device, server, application, service, etc.). In the example of FIG. 14, the user is configuring a computing resource identified by the name "resource_01" and is currently viewing connector-related configurations for the computing resource. These connector-related configurations include, for example, a configuration 1402 that enables a user to identify an on-premises execution agent from possibly a plurality of registered on-premises execution agents to be assigned to the computing resource under configuration. In this manner, the selected on-premises execution agent is used to execute actions involving the computing resource using any associated connector and computing resource-related configurations specified by the user. These connector and computing resource-related configurations, for example, can be included in the requests sent by the IT and security operations application 502 to the specified on-premises action execution agent and optionally cached by the agent for subsequent action executions.

Returning to circle "3" in FIG. 11, in some embodiments, the IT and security operations application 502 identifies an incident involving the IT environment located at least in part in the network 1100 and including the plurality of computing resources 1110. As illustrated by the example in FIG. 11, at least a portion of the IT environment associated with computing resources 1110 is in an on-premises network 1100 that is external to the cloud provider network 504. The incident, for example, might include identification of potential malware, a network-based attack, an operational or performance issue affecting one or more computing resources 1110, etc. In some embodiments, an incident is represented by the IT and security operations application a data structure representing incident data obtained from a tenant network and is further associated with various events, artifacts, and other incident-related data. In some embodiments, users can configure playbooks or other automated actions to be automatically triggered responsive to the IT and security operations application 502 identifying one or more incidents of a particular type or incidents that are associated with defined attributes. In other cases, an action or a playbook can be executed responsive to a user manually selecting the action or playbook for execution.

In some embodiments, at circle "4," the IT and security operations application 502 identifies an action to be executed to mitigate the incident. As indicated above, the identified action may be an on-demand action selected by a user or an action that is part of a playbook defining an orchestrated set of actions and that is configured to execute responsive to identifying incidents of a particular type or that is associated with defined attributes. In some embodiments, executing the action includes interacting with one or more computing resources in the on-premises network (e.g., one or more of computing resources 1110) to perform the action (e.g., to configure a firewall rule, to quarantine a computing device, to restart a server that has failed, etc.). In some embodiments, the on-premises action execution agent 520 is used to cause the one or more computing resources to perform at least a part of the action using configuration information that enables the on-premises action execution agent to communicate with the computing resource. For example, as illustrated above with respect to FIG. 14, the configuration information can include connector information to be used by the on-premises action execution agent 520 to communicate with a computing resource and to instruct the resource to perform defined actions.

In some embodiments, once the action is identified, the IT and security operations application 502 further identifies a computing resource involved in execution of the action and obtains configuration information associated with the computing resource as indicated above. In some embodiments, the configuration information includes an identifier of an on-premises action execution agent assigned to the computing resource, thereby indicating that the computing resource is located in an on-premises network that is external to the provider network 504.

In some embodiments, at circle "5," the IT and security operations application 502 sends, to the on-premises action execution agent 520, a request 1116 to execute the action in the network 1100. In some embodiments, the request 1116 is sent via a first secure connection established between the IT and security operations application 502 and the secure tunnel service 546, and a second secure connection established between the secure tunnel service 546 and the on-premises action execution agent 520 (e.g., via the on-premises proxy 512). In some embodiments, to send the action execution request 1116, the IT and security operations application 502 sends a message to the secure tunnel proxy 1102 and the secure tunnel proxy 1102 generates a structured message (e.g., a JSON-formatted message including details of the request) that can be passed to the on-premises action execution agent 520 via the secure tunnel service 546. The message may include, for example, some or all the following information: action parameters, connection information for the computing resource, an API token, a username, a password, etc. In some embodiments, the IT and security operations application 502 uses a public key from an asymmetric key pair generated by the on-premises action execution agent 520 during installation and registration to ensure the secure transfer of data leaving the IT and security operations application 502.

In some embodiments, upon receiving an action execution request from the IT and security operations application 502, the on-premises action execution agent 520 determines whether the agent currently has a locally stored copy of a connector used to execute the action. For example, a newly installed on-premises action execution agent 520 may not initially have installed any connectors or have installed only a minimal set of connectors. The on-premises action execution agent 520 may then, for example, obtain specific connectors on an as-needed basis responsive to requests to execute different types of actions associated with different types of connectors (e.g., obtain a connector for a firewall application the first time a firewall action is requested, obtain a connector for a type of server the first time a server action is requested, etc.). In the example of FIG. 11, at circle "6," the on-premises action execution agent 520 may determine that it does not currently have access to a connector (e.g., a connector 522) that enables the on-premises action execution agent 520 to communicate with the computing resource 514 involved in executing the requested action and, in response, the agent obtains 1118 the connector from the IT and security operations application 502. In some embodiments, the connector is packaged as an archive file (e.g., a tarball) containing executable code (e.g., Python code) and associated configuration files used to implement the connector which can be invoked by the on-premises action execution agent 520. In some embodiments, the on-premises action execution agent 520 stores the obtained connector in local storage for use in executing the currently requested action and in executing any subsequent actions using the same connector.

In some embodiments, at circle "7," the action specified in the request received by the on-premises action execution agent 520 is executed 1120 by an action execution process 1106 and using a connector 1108. In some embodiments, the on-premises action execution agent 520 decrypts at least a part of the message received from the IT and security operations application 502 via the secure tunnel service 546. The message can include, for example, API tokens, usernames, passwords, etc., that may be used by the on-premises action execution agent to connect to the relevant computing resource(s) to perform the action. As indicated above, to enable such information to be transmitted securely to the on-premises action execution agent 520, the IT and security operations application 502 can encrypt the message using a public key of an asymmetric key pair generated by the agent during installation, where the agent can then decrypt the message using the corresponding private key. In some embodiments, the on-premises action execution agent 520 launches a separate process for each action run against a computing resource and manages the lifespan of the process, which can include communicating with the computing resource to perform the action, sending updates, intermediate results, and final results to the IT and security operations application 502, and tearing down the process once complete.

In some embodiments, at circle "8," the on-premises action execution agent 520 optionally sends action execution update(s) 1122 and other messages to the IT and security operations application 502. In some embodiments, the action execution update(s) 1122 are sent "out-of-band" relative to the secure tunnel service 546, where messages including the updates are instead sent to API endpoints provided by the IT and security operations application 502. The messages sent by the on-premises action execution agent 520 can include, for example, intermediate progress updates, final results, requests to update incident containers, requests to obtain incident artifacts (e.g., emails, files, etc.), and the like. The intermediate progress updates, for example, can be used by the IT and security operations application 502 to generate GUIs or other interfaces that provide information to a user about the status of the action execution, where such information can be updated over time as execution of the action progresses and additional updates are received from the on-premises action execution agent 520. In some embodiments, these messages are sent to one or more API endpoints provided by the IT and security operations application 502.

In some embodiments, to enable the IT and security operations application 502 to authenticate requests received from an on-premises action execution agent 520 sent outside of the secure tunnel service 546, the agent 520 is provisioned with a service account (e.g., including an associated API token) during the initial on-premises action execution agent registration. The credentials for the service account, for example, may be passed through the secure tunnel service 546 to the on-premises action execution agent 520 and stored locally in the on-premises network 1100. In some embodiments, the on-premises action execution agent 520 then includes the API token in requests (e.g., requests associated with the execution of an action to update incident containers, obtain artifacts, send results, etc.) sent to a defined API endpoint of the IT and security operations application 502, which then enables the IT and security operations application 502 to authenticate and authorize the request. Once authenticated and authorized, the IT and security operations application 502 can then pass the request to an appropriate request handler. In some embodiments, to identify a user associated with action execution requests initiated at the IT and security operations application 502, the application generates a hash value based on a run identifier of the action execution and a token associated with the user and includes the hash value in the header of the request. The on-premises action execution agent 520 then includes the hash value in requests sent back to the IT and security operations application 502 to enable the IT and security operations application 502 to validate the request as being associated with the same user. In this manner, the request and execution of the related action can be associated with the appropriate user for auditing and logging purposes (e.g., the IT and security operations application 502 can determine the appropriate user context for the operation and update associated data accordingly). In some embodiments, some types of requests (e.g., requests to initially register an agent, to download connectors, to send debug logs, etc.) may not need to include hash value if the request is not tied to a specific user account.

Figure 15:
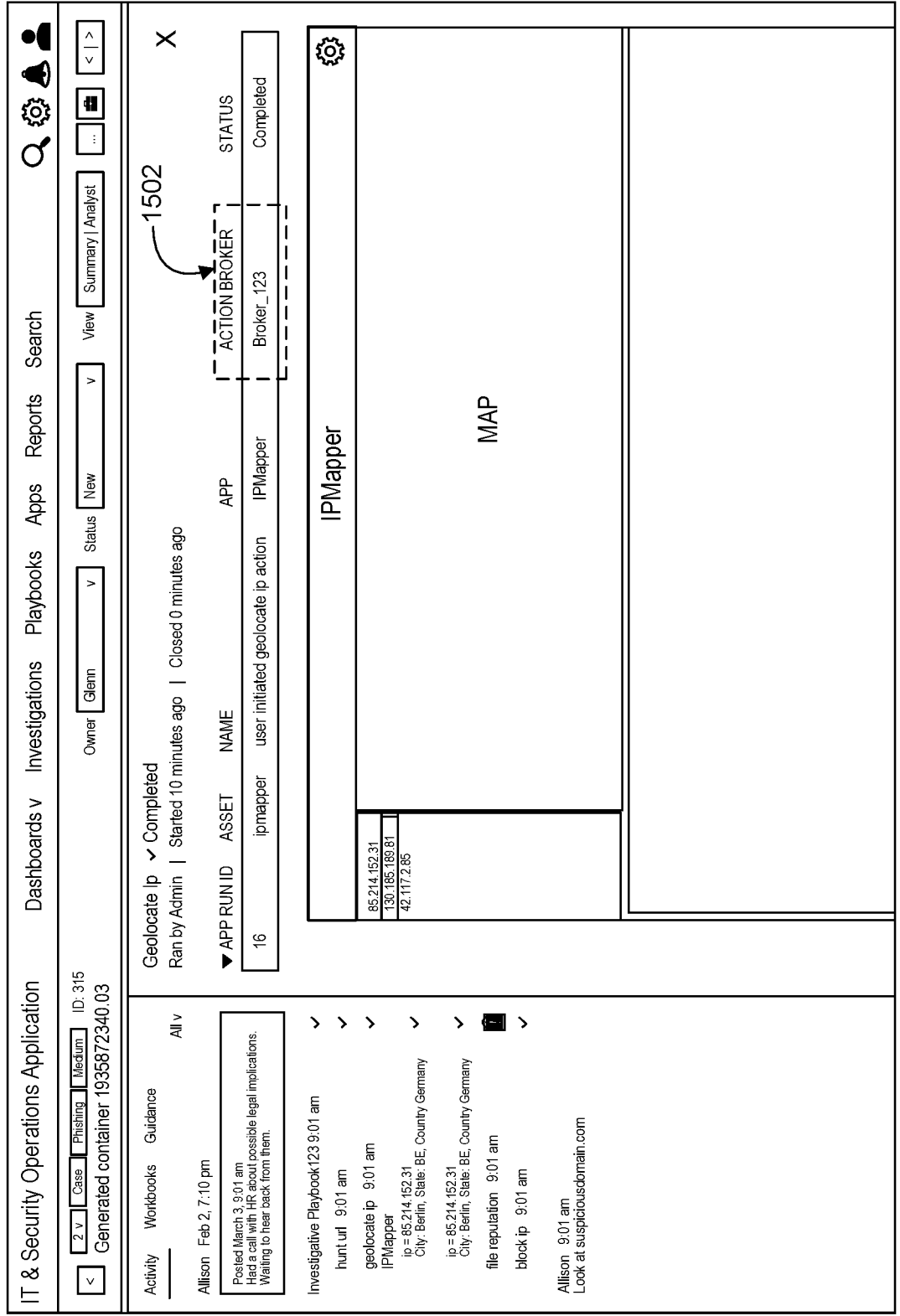
FIG. 15 illustrates an example action results interface displaying an indication of an on-premises action execution agent that executed an action according to some embodiments.

FIG. 15 illustrates an example action results interface displaying an indication of an on-premises action execution agent that executed an action according to some embodiments. As shown, the GUI 1500 includes an activity log detailing the execution of a playbook including a plurality of separate actions, at least some of which were executed in an on-premises environment using an on-premises action execution agent. As illustrated by the element 1502 in the table displaying information about a "geolocate IP" action that was previously executed, the information includes a name of the action, a connector that was used to execute the action, and an identifier of an on-premises action execution agent that was used to perform the action (e.g., "Automation_Broker 123").

In some embodiments, a user can request to cancel an action execution request previously sent to an on-premises action execution agent (e.g., by providing input via a web console or other interface). In some embodiments, responsive to such input, the IT and security operations application 502 sends a "cancel action" message to the corresponding on-premises action execution agent via the secure tunnel service 546. Once the on-premises action execution agent receives the action cancel request, the agent identifies the running process associated with the action execution and terminates the process, if the process is still running. If the on-premises action execution agent is able to terminate the process, the agent sends an action failure result to the IT and security operations application 502 indicating that the action was canceled, where the result optionally includes metadata indicating, e.g., a user that initiate the cancelation, a time at which the action was canceled, etc. In some embodiments, if the action was already completed by the time the cancel request reaches the on-premises action execution agent, the on-premises action execution agent sends an indication to the IT and security operations application 502 indicating that the action could not be canceled.

In some embodiments, the on-premises action execution agent generates logs, metrics, and audit events during various processes described herein and others and sends the logs, metrics and audit events to the IT and security operations application 502. For example, the logs, metrics, and audit events can include at least: information describing on-premises action execution agent installation and execution events, information describing action executions (e.g., enabling users to troubleshoot connection execution issues), and information describing communications between the on-premises action execution agent and the secure tunnel 546 and IT and security operations application 502. In some embodiments, the logs, metrics, and audit events are sent directly to the IT and security operations application 502 using REST APIs, sent via the secure tunnel service 546, or using alternative data transport mechanisms. As illustrated above, such information can be displayed in various web-based or other interfaces provided by the IT and security operations application 502.

Figure 16:
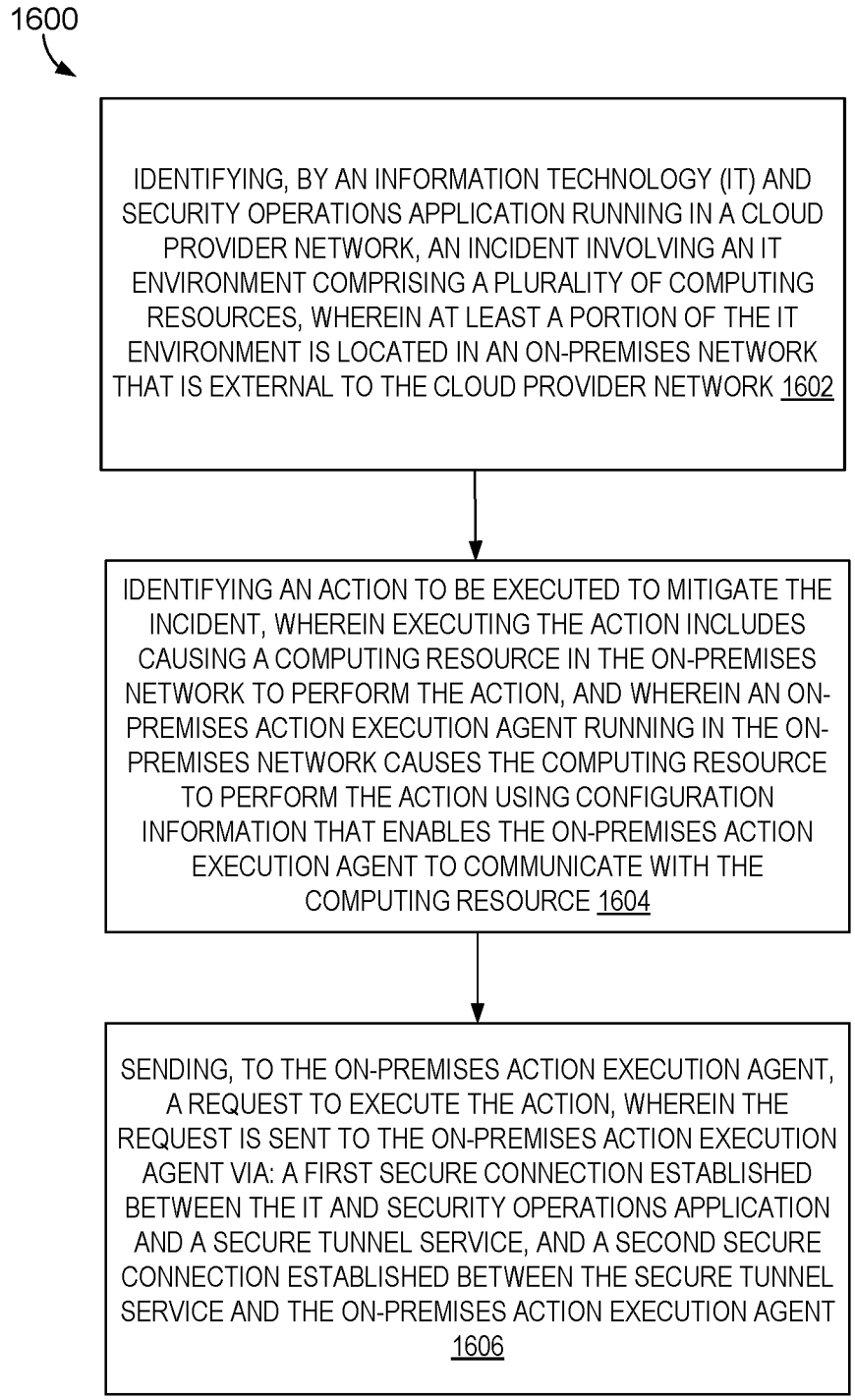
FIG. 16 is a flow diagram illustrating operations of a method for executing an OAR action in an on-premises IT environment using an on-premises action execution agent according to some embodiments.

FIG. 16 is a flow diagram illustrating operations of a method for executing an OAR action in an on-premises IT environment using an on-premises action execution agent according to some embodiments. Some or all the operations 1600 (or other processes described herein, or variations, or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 1600 include, at block 1602, identifying, by an information technology (IT) and security operations application running in a cloud provider network, an incident involving an IT environment comprising a plurality of computing resources, wherein at least a portion of the IT environment is located in an on-premises network that is external to the cloud provider network.

The operations 1600 further include, at block 1604, identifying an action to be executed to mitigate the incident, wherein executing the action includes causing a computing resource in the on-premises network to perform the action, and wherein an on-premises action execution agent running in the on-premises network causes the computing resource to perform the action using configuration information that enables the on-premises action execution agent to communicate with the computing resource.

The operations 1600 further include, at block 1606, sending, to the on-premises action execution agent, a request to execute the action, wherein the request is sent to the on-premises action execution agent via: a first secure connection established between the IT and security operations application and a secure tunnel service, and a second secure connection established between the secure tunnel service and the on-premises action execution agent.

In some embodiments, the operations further include obtaining configuration information associated with the computing resource, and identifying the on-premises action execution agent based on the configuration information, wherein the configuration information indicates that the computing resource is managed by the on-premises action execution agent.

In some embodiments, the operations further include determining, by the on-premises action execution agent, that a connector used to execute the action is not currently available to the on-premises action execution agent, wherein the connector includes executable logic used to perform the action involving the computing resource; obtaining, by the on-premises action execution agent, the connector from the IT and security operations application; and storing the connector for subsequent use by the on-premises action execution agent.

In some embodiments, the request to execute the action includes at least one of: connection information for the computing resource, action parameters, an application programming interface (API) token associated with a user requesting the action, a username, or a password.

In some embodiments, the IT and security operations application sends the request to the secure tunnel service via a first secure tunnel proxy running in the cloud provider network, and wherein the on-premises action execution agent receives the request via a second secure tunnel proxy running in the on-premises network.

In some embodiments, the action is part of a playbook including a plurality of function blocks that collectively define a series of actions to be performed responsive to identification of incidents including the incident, and wherein each function block of the plurality of function blocks includes computer program source code that is executed upon encountering the function block during execution of the playbook.

In some embodiments, the operations further include sending, by the on-premises action execution agent, status information related to execution of the action to the IT and security operations application, wherein the status information is sent to the IT and security operations application using an application programming interface (API) provided by the IT and security operations application.

In some embodiments, the operations further include receiving, by the IT and security operations application, input configuring the computing resource, wherein the input includes an indication to assign the on-premises action execution agent in the IT environment to the computing resource.

In some embodiments, the IT environment includes a plurality of on-premises action execution agents including the on-premises action execution agent, and wherein each on-premises action execution agent of the plurality of on-premises action execution agents is assigned to a respective one or more computing resources of the IT environment.

In some embodiments, the operations further include generating, by the on-premises action execution agent, an asymmetric key pair, wherein a public key of the asymmetric key pair is used by the IT and security operations application to encrypt messages sent by the IT and security operations application to the on-premises action execution agent, and wherein a private key of the asymmetric key pair is used by the on-premises action execution agent to decrypt messages received from the IT and security operations application.

In some embodiments, the operations further include receiving, by the IT and security operations application, a request from the on-premises action execution agent to update data associated with the incident and stored by the IT and security operations application; and updating the data associated with the incident.

In some embodiments, the operations further include receiving, by the IT and security operations application, a request from the on-premises action execution agent to obtain an artifact associated with the incident, wherein the artifact includes one or more of: a value, a file, or an email message; and sending, to the on-premises action execution agent, the artifact, wherein the on-premises action execution agent uses the artifact as part of executing the action.

In some embodiments, the operations further include receiving, from the on-premises action execution agent, a request related to execution of the action, wherein the request includes an application programming interface (API) token used by the IT and security operations application to validate the request, and wherein the API token is associated with a user responsible for the request.

In some embodiments, the operations further include generating a hash value based on an action run identifier associated with the action and an application programming interface (API) token associated with a user requesting the action, wherein the hash value is included in a header of the request sent to the on-premises action execution agent to execute the action.

In some embodiments, the on-premises action execution agent, upon initialization, causes display of an interface displaying a public key of an asymmetric key pair and an authorization code used to register the on-premises action execution agent with the secure tunnel service.

In some embodiments, the operations further include causing display of a graphical user interface (GUI) including a list of on-premises action execution agents registered in association with a user account of the IT and security operations application.

In some embodiments, the operations further include causing display of a graphical user interface (GUI) including status information related to execution of the action, wherein the status information includes identification of the on-premises action execution agent used to execute the action in the IT environment.

In some embodiments, the IT environment includes a plurality of on-premises action execution agents including the on-premises action execution agent, wherein the IT and security operations application sends a plurality of requests to execute a plurality of actions, and wherein execution of the plurality of actions is distributed among the plurality of on-premises action execution agents.

Figure 17:
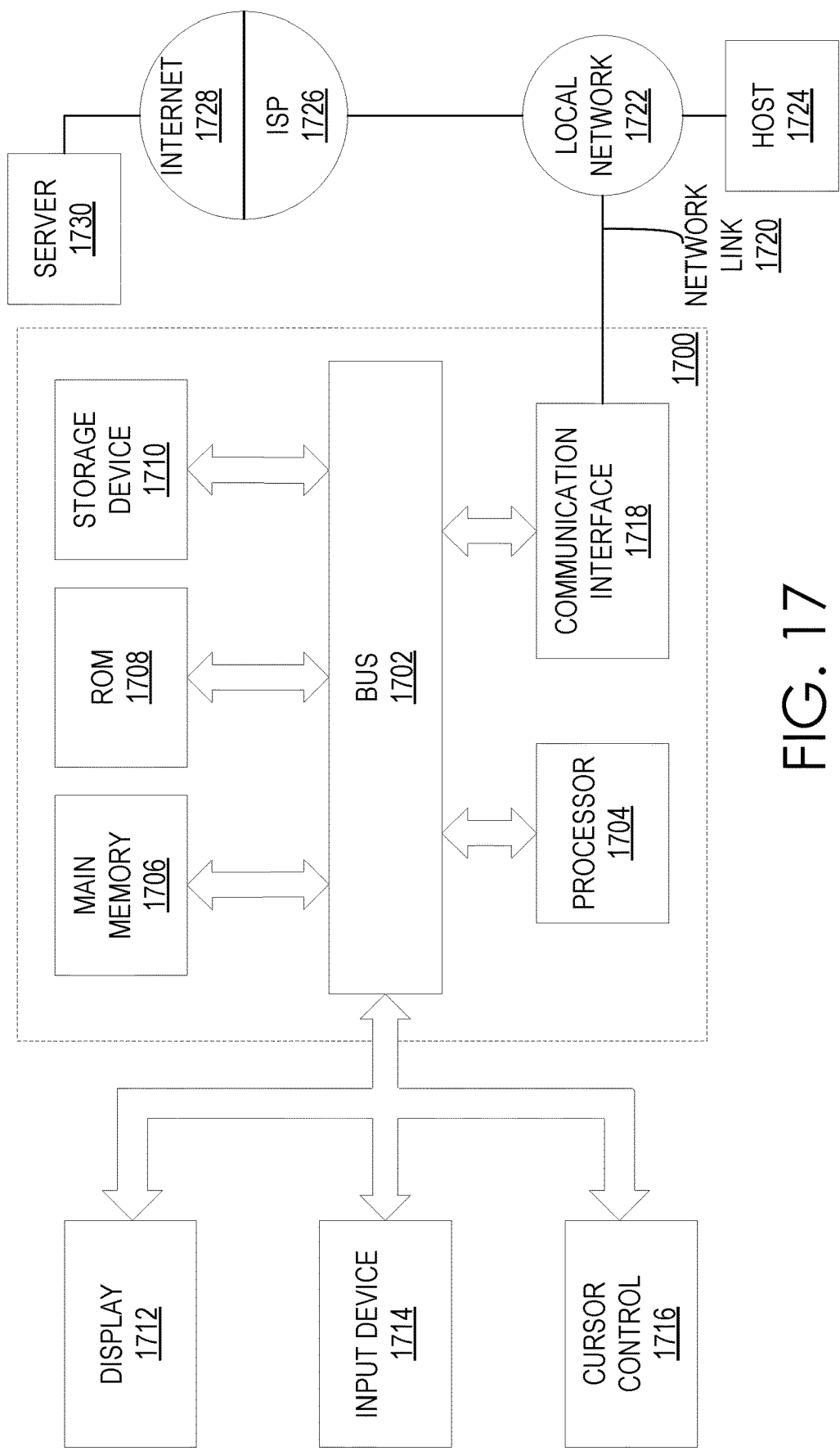
FIG. 17 is a block diagram illustrating an example computer system that may be used in some embodiments.

FIG. 17 is a block diagram that illustrates a computer system 1700 utilized in implementing the above-described techniques, according to an embodiment. Computer system 1700 may be, for example, a desktop computing device, laptop computing device, tablet, smartphone, server appliance, computing mainframe, multimedia device, handheld device, networking apparatus, or any other suitable device.

Computer system 1700 includes one or more buses 1702 or other communication mechanism for communicating information, and one or more hardware processors 1704 coupled with buses 1702 for processing information. Hardware processors 1704 may be, for example, general purpose microprocessors. Buses 1702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1700 also includes a main memory 1706, such as a random access memory (RAM) or other dynamic or volatile storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 a special-purpose machine that is customized to perform the operations specified in the instructions.

Computer system 1700 further includes one or more read only memories (ROM) 1708 or other static storage devices coupled to bus 1702 for storing static information and instructions for processor 1704. One or more storage devices 1710, such as a solid-state drive (SSD), magnetic disk, optical disk, or other suitable non-volatile storage device, is provided and coupled to bus 1702 for storing information and instructions.

Computer system 1700 may be coupled via bus 1702 to one or more displays 1712 for presenting information to a computer user. For instance, computer system 1700 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1712.

One or more input devices 1714 are coupled to bus 1702 for communicating information and command selections to processor 1704. One example of an input device 1714 is a keyboard, including alphanumeric and other keys. Another type of user input device 1714 is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. Yet other examples of suitable input devices 1714 include a touch-screen panel affixed to a display 1712, cameras, microphones, accelerometers, motion detectors, and/or other sensors. In an embodiment, a network-based input device 1714 may be utilized. In such an embodiment, user input and/or other information or commands may be relayed via routers and/or switches on a Local Area Network (LAN) or other suitable shared network, or via a peer-to-peer network, from the input device 1714 to a network link 1720 on the computer system 1700.

A computer system 1700 may implement techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1700 can receive the data on the network and demodulate the signal to decode the transmitted instructions. Appropriate circuitry can then place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

A computer system 1700 may also include, in an embodiment, one or more communication interfaces 1718 coupled to bus 1702. A communication interface 1718 provides a data communication coupling, typically two-way, to a network link 1720 that is connected to a local network 1722. For example, a communication interface 1718 may be an integrated services digital network (ISDN) card, cable modem, satellite modem, or a modem to provide a data communication connection to a corresponding type of telephone line. As another example, the one or more communication interfaces 1718 may include a local area network (LAN) card to provide a data communication connection to a compatible LAN. As yet another example, the one or more communication interfaces 1718 may include a wireless network interface controller, such as a 802.11-based controller, Bluetooth controller, Long Term Evolution (LTE) modem, and/or other types of wireless interfaces. In any such implementation, communication interface 1718 sends and receives electrical, electromagnetic, or optical signals that carry digital data streams representing various types of information.

Network link 1720 typically provides data communication through one or more networks to other data devices. For example, network link 1720 may provide a connection through local network 1722 to a host computer 1724 or to data equipment operated by a Service Provider 1726. Service Provider 1726, which may for example be an Internet Service Provider (ISP), in turn provides data communication services through a wide area network, such as the world-wide packet data communication network now commonly referred to as the "internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

In an embodiment, computer system 1700 can send messages and receive data, including program code and/or other types of instructions, through the network(s), network link 1720, and communication interface 1718. In the Internet example, a server 1730 might transmit a requested code for an application program through Internet 1728, ISP 1726, local network 1722 and communication interface 1718. The received code may be executed by processor 1704 as it is received, and/or stored in storage device 1710, or other non-volatile storage for later execution. As another example, information received via a network link 1720 may be interpreted and/or processed by a software component of the computer system 1700, such as a web browser, application, or server, which in turn issues instructions based thereon to a processor 1704, possibly via an operating system and/or other intermediate layers of software components.

In an embodiment, some or all of the systems described herein may be or comprise server computer systems, including one or more computer systems 1700 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

7.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
sending, by an information technology (IT) and security operations application running in a cloud provider network, and to an on-premises action execution agent running in an on-premises network that is external to the cloud provider network, an application programming interface (API) token associated with an account to be used by the on-premises action execution agent to interact with the IT and security operations application;
identifying, by the IT and security operations application, an incident involving one or more of a plurality of computing resources located in the on-premises network;
identifying an action to be executed to mitigate the incident, wherein executing the action includes causing a computing resource in the on-premises network to perform the action, and wherein an on-premises action execution agent running in the on-premises network causes the computing resource to perform the action using configuration information that enables the on-premises action execution agent to communicate with the computing resource; and
sending, to the on-premises action execution agent, a request to execute the action;
receiving, from the on-premises action execution agent, a response including results information based on executing the action, wherein the response includes the API token associated with the account;
authenticating, based on the API token, the request as being associated with the account; and
updating data associated with the incident based on the results information.

2. The method of claim 1, further comprising:
obtaining configuration information associated with the computing resource; and
identifying the on-premises action execution agent based on the configuration information, wherein the configuration information indicates that the computing resource is managed by the on-premises action execution agent.

3. The method of claim 1, further comprising:
determining, by the on-premises action execution agent, that a connector used to execute the action is not currently available to the on-premises action execution agent, wherein the connector includes executable logic used to perform the action;
obtaining, by the on-premises action execution agent, the connector from the IT and security operations application; and
storing the connector for subsequent use by the on-premises action execution agent.

4. The method of claim 1, wherein the request to execute the action includes at least one of: connection information for the computing resource, action parameters, the API token, a username, or a password.

5. The method of claim 1, wherein the IT and security operations application sends the request to a secure tunnel service via a first secure tunnel proxy running in the cloud provider network, and wherein the on-premises action execution agent receives the request via a second secure tunnel proxy running in the on-premises network.

6. The method of claim 1, wherein the action is part of a playbook including a plurality of function blocks that collectively define a series of actions to be performed responsive to identification of incidents including the incident, and wherein each function block of the plurality of function blocks includes computer program source code that is executed upon encountering the function block during execution of the playbook.

7. The method of claim 1, further comprising sending, by the on-premises action execution agent, status information related to execution of the action to the IT and security operations application, wherein the status information is sent to the IT and security operations application using an API provided by the IT and security operations application.

8. The method of claim 1, further comprising receiving, by the IT and security operations application, input configuring the computing resource, wherein the input includes an indication to assign the on-premises action execution agent in the on-premises network to the computing resource.

9. The method of claim 1, wherein the on-premises network includes a plurality of on-premises action execution agents including the on-premises action execution agent, and wherein each on-premises action execution agent of the plurality of on-premises action execution agents is assigned to a respective one or more computing resources of the on-premises network.

10. The method of claim 1, further comprising generating, by the on-premises action execution agent, an asymmetric key pair, wherein a public key of the asymmetric key pair is used by the IT and security operations application to encrypt messages sent by the IT and security operations application to the on-premises action execution agent, and wherein a private key of the asymmetric key pair is used by the on-premises action execution agent to decrypt messages received from the IT and security operations application.

11. The method of claim 1, further comprising:
receiving, by the IT and security operations application, a request from the on-premises action execution agent to obtain an artifact associated with the incident, wherein the artifact includes one or more of: a value, a file, or an email message; and
sending, to the on-premises action execution agent, the artifact, wherein the on-premises action execution agent uses the artifact as part of executing the action.

12. The method of claim 1, further comprising generating a hash value based on an action run identifier associated with the action and the API token associated with a user requesting the action, wherein the hash value is included in a header of the request sent to the on-premises action execution agent to execute the action.

13. The method of claim 1, wherein the on-premises action execution agent, upon initialization, causes display of an interface displaying a public key of an asymmetric key pair and an authorization code used to register the on-premises action execution agent with a secure tunnel service.

14. The method of claim 1, further comprising causing display of a graphical user interface (GUI) including a list of on-premises action execution agents registered in association with a user account of the IT and security operations application.

15. The method of claim 1, further comprising causing display of a graphical user interface (GUI) including status information related to execution of the action, wherein the status information includes identification of the on-premises action execution agent used to execute the action in the on-premises network.

16. The method of claim 1, wherein the on-premises network includes a plurality of on-premises action execution agents including the on-premises action execution agent, wherein the IT and security operations application sends a plurality of requests to execute a plurality of actions, and wherein execution of the plurality of actions is distributed among the plurality of on-premises action execution agents.

17. A computing device, comprising:
a processor; and
a non-transitory computer-readable medium having stored thereon instructions that, when executed by the processor, cause the processor to perform operations including:
sending, by an information technology (IT) and security operations application running in a cloud provider network, and to an on-premises action execution agent running in an on-premises network that is external to the cloud provider network, an application programming interface (API) token associated with an account to be used by the on-premises action execution agent to interact with the IT and security operations application;
identifying, by the IT and security operations application, an incident involving one or more of a plurality of computing resources located in the on-premises network;
identifying an action to be executed to mitigate the incident, wherein executing the action includes causing a computing resource in the on-premises network to perform the action, and wherein an on-premises action execution agent running in the on-premises network causes the computing resource to perform the action using configuration information that enables the on-premises action execution agent to communicate with the computing resource; and
sending, to the on-premises action execution agent, a request to execute the action;
receiving, from the on-premises action execution agent, a response including results information based on executing the action, wherein the response includes the API token associated with the account;
authenticating, based on the API token, the request as being associated with the account; and
updating data associated with the incident based on the results information.

18. A non-transitory computer-readable medium having stored thereon instructions that, when executed by one or more processors, cause the one or more processor to perform operations including:
sending, by an information technology (IT) and security operations application running in a cloud provider network, and to an on-premises action execution agent running in an on-premises network that is external to the cloud provider network, an application programming interface (API) token associated with an account to be used by the on-premises action execution agent to interact with the IT and security operations application;
identifying, by the IT and security operations application, an incident involving one or more of a plurality of computing resources located in the on-premises network;
identifying an action to be executed to mitigate the incident, wherein executing the action includes causing a computing resource in the on-premises network to perform the action, and wherein an on-premises action execution agent running in the on-premises network causes the computing resource to perform the action using configuration information that enables the on-premises action execution agent to communicate with the computing resource; and
sending, to the on-premises action execution agent, a request to execute the action;
receiving, from the on-premises action execution agent, a response including results information based on executing the action, wherein the response includes the API token associated with the account;
authenticating, based on the API token, the request as being associated with the account; and
updating data associated with the incident based on the results information.

* * * * *